(12) United States Patent
Abe et al.

(10) Patent No.: US 11,313,343 B2
(45) Date of Patent: Apr. 26, 2022

(54) HYDROELECTRIC POWER GENERATION SYSTEM

(71) Applicant: DAIKIN INDUSTRIES, LTD., Osaka (JP)

(72) Inventors: Takahiro Abe, Osaka (JP); Atsushi Suhara, Osaka (JP); Takahiro Yokoyama, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/476,923

(22) PCT Filed: Jan. 22, 2018

(86) PCT No.: PCT/JP2018/001814
§ 371 (c)(1),
(2) Date: Jul. 10, 2019

(87) PCT Pub. No.: WO2018/135661
PCT Pub. Date: Jul. 26, 2018

(65) Prior Publication Data
US 2019/0331086 A1    Oct. 31, 2019

(30) Foreign Application Priority Data

Jan. 23, 2017  (JP) .............................. JP2017-009355
Jan. 23, 2017  (JP) .............................. JP2017-009358

(51) Int. Cl.
*F03B 15/16*   (2006.01)
*H02P 9/04*    (2006.01)
(Continued)

(52) U.S. Cl.
CPC ................ *F03B 15/16* (2013.01); *H02P 9/04* (2013.01); *H02P 9/102* (2013.01);
(Continued)

(58) Field of Classification Search
CPC .. F03B 15/16; H02P 9/04; H02P 9/102; H02P 2101/10; F05B 2220/32; F05B 2270/20; F05B 2270/335
See application file for complete search history.

(56) References Cited

U.S. PATENT DOCUMENTS 4,640,664 A    2/1987  Sato et al.
4,674,279 A *  6/1987  Ali ......................... F03B 15/14
                                                    60/398
(Continued)

FOREIGN PATENT DOCUMENTS

JP    59-168278 A    9/1984
JP    59-211110 A    11/1984
(Continued)

OTHER PUBLICATIONS

International Search Report, issued in PCT/JP2018/001814, dated Apr. 17, 2018.

*Primary Examiner* — Viet P Nguyen
(74) *Attorney, Agent, or Firm* — Birch, Stewart, Kolasch & Birch, LLP

(57) ABSTRACT

A hydroelectric power generation system includes: a generator driven by the hydraulic turbine; a head adjuster adjusting an effective head of the hydraulic turbine; and a controller cooperatively executing: flow rate control for controlling the generator such that a flow rate in the hydraulic turbine is brought close to a target flow rate; and head adjusting control for adjusting the effective head of the hydraulic turbine using the head adjuster such that the effective head of the hydraulic turbine falls within a first range.

8 Claims, 23 Drawing Sheets

(51) Int. Cl.
*H02P 9/10* (2006.01)
*H02P 101/10* (2015.01)

(52) U.S. Cl.
CPC ....... *F05B 2220/32* (2013.01); *F05B 2270/20* (2013.01); *F05B 2270/335* (2013.01); *H02P 2101/10* (2015.01)

(56) References Cited

U.S. PATENT DOCUMENTS

| | | | |
|---|---|---|---|
| 2004/0126223 | A1 | 7/2004 | Maloney |
| 2009/0236852 | A1 | 9/2009 | Balzano |
| 2012/0086204 | A1* | 4/2012 | Re .......................... F03B 13/00 |
| | | | 290/43 |
| 2012/0326443 | A1* | 12/2012 | Vince ...................... F03B 15/00 |
| | | | 290/7 |
| 2014/0294590 | A1* | 10/2014 | Marier .................... F03B 3/121 |
| | | | 416/223 R |
| 2017/0314527 | A1 | 11/2017 | Sakamoto et al. |
| 2018/0202844 | A1* | 7/2018 | Artiuch ..................... G01F 1/08 |

FOREIGN PATENT DOCUMENTS

| | | |
|---|---|---|
| JP | 2-201613 A | 8/1990 |
| JP | 2002-242813 A | 8/2002 |
| JP | 2002-354895 A | 12/2002 |
| JP | 2004-360479 A | 12/2004 |
| JP | 2007-56829 A | 3/2007 |
| JP | 2014-214710 A | 11/2014 |
| JP | 2016-59214 A | 4/2016 |
| JP | 2016-118207 A | 6/2016 |

\* cited by examiner

HYDROELECTRIC POWER GENERATION SYSTEM

TECHNICAL FIELD

The present invention relates to a hydroelectric power generation system.

BACKGROUND ART

There has been a hydroelectric power generation system that generates power by a fluid (e.g., water) flowing through a penstock or channel.

For example, a hydroelectric power generation system disclosed in Patent Document 1 includes a hydraulic turbine disposed in a penstock or a channel, and an electric generator driven by the hydraulic turbine. When water flows through the hydraulic turbine, the hydraulic turbine is rotated, and the electric generator connected to the hydraulic turbine is driven. As a result, the generator generates electric power. The generated electric power is supplied to a predetermined electric power system.

CITATION LIST

Patent Documents

Patent Document 1: Japanese Unexamined Patent Publication No. 2014-214710

SUMMARY OF THE INVENTION

Technical Problem

In a channel to which the hydroelectric power generation system is applied, a predetermined restriction may be imposed on the flow rate of a fluid flowing through the channel. In such a case, the torque of the generator and the number of revolutions of the generator are controlled, such that the flow rate in the hydraulic turbine can be brought close to a target flow rate. In such a channel, a predetermined restriction may be imposed on the pressure downstream of the hydraulic turbine. In such a case, by controlling the torque of and the rotational speed of the generator, the pressure downstream of the hydraulic turbine can be brought close to the target pressure.

On the other hand, when such flow rate control and pressure control are executed, a change in the effective head of the hydraulic turbine or a change in the target value of the flow rate or a change in the target value of the pressure may cause the operation point of the hydraulic turbine to be deviated from an proper operation region. This may adversely cause cavitation or improper control of the generator.

The present invention has been made in view of the above problems, and attempts to provide a hydroelectric power generation system capable of reducing deviation of the operation point of a hydraulic turbine from its operation region while adjusting the flow rate of the hydraulic turbine or the pressure of a fluid downstream of the hydraulic turbine to respective target values.

Solution to the Problem

A first aspect of the invention is a hydroelectric power generation system including: a hydraulic turbine (11) disposed in a channel (5) through which a fluid flows; a generator (12) driven by the hydraulic turbine (11); a head adjuster (21) adjusting an effective head of the hydraulic turbine (11); and a controller (40) cooperatively executing: flow rate control for controlling the generator (12) such that a flow rate in the hydraulic turbine (11) is brought close to a target flow rate; and head adjusting control for adjusting the effective head of the hydraulic turbine (11) using the head adjuster (21) such that the effective head of the hydraulic turbine (11) falls within a first range.

In this configuration, the controller (40) cooperatively executes the flow rate control and the head adjusting control. Specifically, in the flow rate control, the generator (12) is controlled so that the flow rate of the fluid flowing through the hydraulic turbine (11) is brought close to the target flow rate. When such control of the generator (12) is executed, the effective head of the hydraulic turbine (11) is adjusted using the head adjuster (21) such that the operation point of the hydraulic turbine (11) falls within the first range. Therefore, even if the operation point of the hydraulic turbine (11) deviates from the proper operation region, the operation point can be quickly returned to the proper operation region. When the effective head of the hydraulic turbine (11) is adjusted, the flow rate in the hydraulic turbine (11) is also changed. However, the above-described flow rate control allows the flow rate in the hydraulic turbine (11) to converge to the target flow rate.

A second aspect is an embodiment of the first aspect. In the second aspect, if a condition indicating that the effective head of the hydraulic turbine (11) is larger than an upper limit value of the first range is satisfied, the controller (40) executes, as the head adjusting control, first control for reducing the effective head of the hydraulic turbine (11) using the head adjuster (21).

In this configuration, if the condition indicating that the effective head of the hydraulic turbine (11) is larger than the upper limit value of the first range is satisfied, it is determined that the operation point of the hydraulic turbine (11) has reached a so-called cavitation region, and the first control is executed to reduce the effective head of the hydraulic turbine (11). This can return the operation point of the hydraulic turbine (11) from the cavitation region to the proper operation region.

A third aspect is an embodiment of the second aspect. In the third aspect, after executing the first control, if a condition indicating that the effective head of the hydraulic turbine (11) is larger than a predetermined threshold value smaller than the upper limit value of the first range is satisfied, the controller (40) further reduces the effective head of the hydraulic turbine (11) using the head adjuster (21).

In this configuration, even if the operation point of the hydraulic turbine (11) has reached the first range from the cavitation region by the first control, the effective head of the hydraulic turbine (11) is further reduced in a situation where the effective head of the hydraulic turbine (11) is still larger than the predetermined threshold value. This can reliably return the operation point of the hydraulic turbine (11) from the cavitation region to the proper operation region. Further, this can substantially avoid the occurrence of hunting of the operation point of the hydraulic turbine (11) between the cavitation region and the proper operation region.

A fourth aspect is an embodiment of any one of the first to third aspects. In the fourth aspect, if a condition indicating that the effective head of the hydraulic turbine (11) is smaller than a lower limit value of the first range is satisfied, the controller (40) executes, as the head adjusting control, second control for increasing the effective head of the hydraulic turbine (11) using the head adjuster (21).

In this configuration, if the condition that the effective head of the hydraulic turbine (11) is smaller than the lower limit of the first range is satisfied, it is determined that the operation point of the hydraulic turbine (11) has reached a so-called operating limit curve, and the second control is executed to increase the effective head of the hydraulic turbine (11). This can return the operation point of the hydraulic turbine (11) from the operating limit curve to the proper operation region. The term "operating limit curve" as used herein means a boundary of the operation point at which it becomes impossible to adjust the flow rate in the hydraulic turbine (11) by the control of the generator (12) such as control of a torque value and control of rotational speed.

A fifth aspect is an embodiment of the fourth aspect. In the fifth aspect, after executing the second control, if a condition indicating that the effective head of the hydraulic turbine (11) is smaller than a predetermined threshold value larger than the lower limit value of the first range is satisfied, the controller (40) further increases the effective head of the hydraulic turbine (11) using the head adjuster (21).

In this configuration, even if the operation point of the hydraulic turbine (11) has reached the first range from the operating limit curve by the second control, the effective head of the hydraulic turbine (11) is further increased in a situation where the effective head of the hydraulic turbine (11) is still smaller than the predetermined threshold value. This can reliably return the operation point of the hydraulic turbine (11) from the operating limit curve to the proper operation region. Further, this can substantially avoid the occurrence of hunting of the operation point of the hydraulic turbine (11) between the operating limit curve and the proper operation region.

A sixth aspect is an embodiment of any one of the first to fifth aspects. In the sixth aspect, the controller (40) executes the flow rate control and the head adjusting control at different timings.

In this configuration, the flow rate control and the head adjusting control are executed at different timings. If the flow rate control and the head adjusting control are executed at the same timing, hunting of the operation point of the hydraulic turbine (11) occurs, such that the time until the flow rate in the hydraulic turbine (11) converges to the target flow rate or the time until the operation point of the hydraulic turbine (11) reaches the proper operation region is made longer. Such hunting may be avoided by executing the flow rate control and the head adjusting control at different timings.

A seventh aspect is an embodiment of any one of the first to sixth aspects. In the seventh aspect, the controller (40) cooperatively executes: the flow rate control; and generated electric power control for adjusting the effective head of the hydraulic turbine (11) using the head adjuster (21) such that electric power generated by the generator (12) is brought close to a target electric power.

In this configuration, the controller (40) cooperatively executes the flow rate control and the generated electric power control. Specifically, in the flow rate control, the generator (12) is controlled so that the flow rate of the fluid flowing through the hydraulic turbine (11) is brought close to the target flow rate. This flow rate control can bring the flow rate of the hydraulic turbine (11) close to the target value. Furthermore, when the effective head is adjusted by the head adjuster (12) in the generated electric power control, the generated electric power of the generator (12) can be adjusted. Thus, the electric power generated by the generator (12) can be brought close to the target generated electric power. When the effective head of the hydraulic turbine (11) is adjusted in this manner, the flow rate of the hydraulic turbine (11) is also changed. However, the above-described flow rate control allows the flow rate of the hydraulic turbine (11) to converge to the target flow rate.

An eighth aspect is an embodiment of seventh aspect. In the eighth aspect, the controller (40) executes the flow rate control and the generated electric power control at different timings.

In this configuration, the flow rate control and the generated electric power control are executed at different timings. If the flow rate control and the generated electric power control are executed at the same timing, hunting of the operation point of the hydraulic turbine (11) occurs, such that the time until the flow rate in the hydraulic turbine (11) converges to the target flow rate or the time until the electric power generated by the generator (12) reaches the target generated electric power is made longer. Such hunting may be avoided by executing the flow rate control and the generated electric power control at different timings.

A ninth aspect is an embodiment of the seventh or eighth aspect. In the ninth aspect, in the generated electric power control, the controller (40) adjusts the effective head of the hydraulic turbine (11) using the head adjuster (21) such that the electric power generated by the generator (12) is brought close to a maximum generated electric power.

In this configuration, the flow rate control and the generated electric power control are cooperatively executed, whereby the flow rate in the hydraulic turbine (11) converges to the target flow rate, and the electric power generated by the generator (12) converges to the maximum generated electric power.

A tenth aspect is an embodiment of any one of the first to ninth aspects. In the tenth aspect, the head adjuster (21) is configured as a valve (21) disposed in series with the hydraulic turbine (11) in the channel (5).

In this configuration, the opening degree of the valve (21) as the head adjuster is adjusted to adjust the effective head of the hydraulic turbine (11).

An eleventh aspect of the invention is a hydroelectric power generation system including: a hydraulic turbine (11) disposed in a channel (5) through which a fluid flows; a generator (12) driven by the hydraulic turbine (11); a flow rate adjuster (21) adjusting a flow rate in the hydraulic turbine (11); and a controller (40) cooperatively executing: pressure control for controlling the generator (12) such that a pressure of a fluid downstream of the hydraulic turbine (11) is brought close to a target pressure; and flow rate adjusting control for adjusting the flow rate (Q) in the hydraulic turbine (11) using the flow rate adjuster (21) such that the flow rate in the hydraulic turbine (11) falls within a second range.

In this configuration, the pressure control and the flow rate adjusting control are cooperatively executed. Specifically, in the pressure control, the generator (12) is controlled so that the pressure of the fluid downstream of the hydraulic turbine (11) is brought close to the target pressure. When such control of the generator (12) is executed, the flow rate in the hydraulic turbine (11) is adjusted using the flow rate adjuster (21) such that the operation point of the hydraulic turbine (11) falls within the second range. Therefore, even if the operation point of the hydraulic turbine (11) deviates from the proper operation region, the operation point can be quickly returned to the proper operation region. When the flow rate of the hydraulic turbine (11) is adjusted, the pressure of the fluid downstream of the hydraulic turbine (11) is also changed. However, the above-described pressure control allows the pressure in the hydraulic turbine (11) to converge to the target pressure.

A twelfth aspect of the invention is an embodiment of eleventh aspect. In the twelfth aspect, if a condition indicating that the flow rate of the hydraulic turbine (11) is smaller than a lower limit value of the second range is satisfied, the controller (40) executes, as the flow rate adjusting control, third control for increasing the flow rate in the hydraulic turbine (11) using the flow rate adjuster (21).

In this configuration, if the condition indicating that the effective head of the hydraulic turbine (11) is smaller than the lower limit value of the second range is satisfied, it is determined that the operation point of the hydraulic turbine (11) has reached a so-called cavitation region, and the third control is executed to increase the flow rate of the hydraulic turbine (11). This can return the operation point of the hydraulic turbine (11) from the cavitation region to the proper operation region.

A thirteenth aspect is an embodiment of the twelfth aspect. In the thirteenth aspect, after executing the third control, if a condition indicating that the flow rate of the hydraulic turbine (11) is smaller than a predetermined threshold value larger than the lower limit value of the second range is satisfied, the controller (40) further increases the flow rate (Q) in the hydraulic turbine (11) using the flow rate adjuster (21).

In this configuration, even if the operation point of the hydraulic turbine (11) has reached the second range from the cavitation region by the third control, the flow rate (Q) of the hydraulic turbine (11) is further increased in a situation where the flow rate of the hydraulic turbine (11) is still smaller than the predetermined threshold value. This can reliably return the operation point of the hydraulic turbine (11) from the cavitation region to the proper operation region. Further, this can substantially avoid the occurrence of hunting of the operation point of the hydraulic turbine (11) between the cavitation region and the proper operation region.

A fourteenth aspect is an embodiment of any one of the eleventh to thirteenth aspects. In the fourteenth aspect, if a condition indicating that the flow rate of the hydraulic turbine (11) is larger than an upper limit value of the second range is satisfied, the controller (40) executes, as the flow rate adjusting control, fourth control for reducing the flow rate in the hydraulic turbine (11) using the flow rate adjuster (21).

In this configuration, if the condition that the flow rate in the hydraulic turbine (11) is larger than the upper limit of the second range is satisfied, it is determined that the operation point of the hydraulic turbine (11) has reached a so-called operating limit curve, and the fourth control is executed to reduce the flow rate in the hydraulic turbine (11). This can reliably return the operation point of the hydraulic turbine (11) from the operating limit curve to the proper operation region. The term "operating limit curve" as used herein means a boundary of the operation point at which it becomes impossible to adjust the pressure of the fluid downstream of the hydraulic turbine (11) by the control of the generator (12) such as control of a torque value and control of rotational speed.

A fifteenth aspect is an embodiment of the fourteenth aspect. In the fifteenth aspect, after executing the fourth control, if a condition indicating that the flow rate of the hydraulic turbine (11) is larger than a predetermined threshold value smaller than the upper limit value of the second range is satisfied, the controller (40) further reduces the flow rate (Q) in the hydraulic turbine (11) using the flow rate adjuster (21).

In this configuration, even when the operation point of the hydraulic turbine (11) reaches the second range from the operating limit curve by the fourth control, the flow rate of the hydraulic turbine (11) is further reduced if the flow rate of the hydraulic turbine (11) is still larger than the predetermined threshold value. This can reliably return the operation point of the hydraulic turbine (11) from the operating limit curve to the proper operation region. Further, this can substantially avoid the occurrence of hunting of the operation point of the hydraulic turbine (11) between the operating limit curve and the proper operation region.

A sixteenth aspect is an embodiment of any one of the eleventh to fifteenth aspects. In the sixteenth aspect, the controller (40) executes the pressure control and the flow rate adjusting control at different timings.

In this configuration, the pressure control and the flow rate adjusting control are executed at different timings. If the pressure control and the flow rate adjusting control are executed at the same timing, hunting of the operation point of the hydraulic turbine (11) occurs, such that the time until the pressure of the fluid downstream of the hydraulic turbine (11) converges to the target pressure or the time until the operation point of the hydraulic turbine (11) reaches the proper operation region is made longer. Such hunting may be avoided by executing the pressure control and the head adjusting control at different timings.

A seventeenth aspect is an embodiment of any one of the eleventh to sixteenth aspects. In the seventeenth aspect, the controller (40) cooperatively executes: the pressure control; and generated electric power control for adjusting the flow rate in the hydraulic turbine (11) using the flow rate adjuster (21) such that electric power generated by the generator (12) is brought close to a target electric power.

In this configuration, the controller (40) cooperatively executes the pressure control and the generated electric power control. Specifically, in the pressure control, the generator (12) is controlled so that the pressure of the fluid downstream of the hydraulic turbine (11) is brought close to the target pressure. This pressure control allows the pressure of the fluid to be brought close to the target generated electric power. Furthermore, when the flow rate in the hydraulic turbine (11) is adjusted by the head adjuster (21) in the generated electric power control, the electric power generated by the generation (12) can be adjusted. Thus, the electric power generated by the generator (12) can be brought close to the target generated electric power. As described above, when the flow rate in the hydraulic turbine (11) is adjusted, the pressure of the fluid downstream of the hydraulic turbine (11) is also changed. However, the above-described pressure control allows the pressure of the fluid to converge to the target pressure.

An eighteenth aspect is an embodiment of the seventeenth aspect. In the eighteenth aspect, the controller (40) executes the pressure control and the generated electric power control at different timings.

In this configuration, the pressure control and the generated electric power control are executed at different timings. If the pressure control and the generated electric power control are executed at the same timing, hunting of the operation point of the hydraulic turbine (11) occurs, such that the time until the pressure of the fluid downstream of the hydraulic turbine (11) converges to the target pressure or the time until the electric power generated by the generator (12) reaches the target generated electric power is made longer.

Such hunting may be avoided by executing the pressure control and the generated electric power control at different timings.

A nineteenth aspect is an embodiment of the seventeenth or eighteenth aspect. In the nineteenth aspect, in the generated electric power control, the controller (40) adjusts the flow rate in the hydraulic turbine (11) using the flow rate adjuster (21) such that the electric power generated by the generator (12) is brought close to a maximum generated electric power.

In this configuration, the pressure control and the generated electric power control are cooperatively executed, whereby the pressure of the fluid downstream of the hydraulic turbine (11) converges to the target pressure, and the electric power generated by the electric generator (12) converges to the maximum generated electric power.

A twentieth aspect is an embodiment of any one of the eleventh to nineteenth aspects. In the twentieth aspect, the flow rate adjuster (21) is configured as a valve (21) disposed in series with the hydraulic turbine (11) in the channel (5).

In this configuration, the opening degree of the valve (21) as the flow rate adjuster is adjusted to adjust the effective head of the hydraulic turbine (11).

Advantages of the Invention

According to the first aspect, the flow rate control for bring the flow rate of the hydraulic turbine (11) close to the target flow rate, and the head adjusting control for adjusting the effective head of the hydraulic turbine (11) so as to return the operation point of the hydraulic turbine (11) to the proper operation region are cooperatively executed. Thus, this can substantially prevent the operation point of the hydraulic turbine (11) from coming out of the proper operation region while maintaining the flow rate in the hydraulic turbine (11) at the target flow rate.

According to the eleventh aspect, the pressure control for bringing the pressure of the fluid downstream of the hydraulic turbine (11) close to the target pressure, and the flow rate control for adjusting the flow rate of the hydraulic turbine (11) so as to return the operation point of the hydraulic turbine (11) to the proper operation region are cooperatively executed. Thus, this can substantially prevent the operation point of the hydraulic turbine (11) from coming out of the proper operation region while maintaining the pressure of the fluid downstream of the hydraulic turbine (11) at the target pressure.

According to the second and twelfth aspects, it is possible to substantially prevent the operation point of the hydraulic turbine (11) from staying in the cavitation region. In particular, according to the third and thirteenth aspects, it is possible to reduce the occurrence of hunting of the operation point of the hydraulic turbine (11) between the cavitation region and the proper operation region.

According to the fourth and fourteenth aspects, it is possible to prevent the operation point of the hydraulic turbine (11) from staying on the operating limit curve. In particular, according to the fifth and fifteenth aspects, it is possible to reduce the occurrence of hunting of the operation point of the hydraulic turbine (11) between the operating limit curve and the proper operation region.

According to the sixth and sixteenth aspects, it is possible to reliably return the operation point of the hydraulic turbine (11) to the normal operating region while substantially avoiding occurrence of hunting of the operation point of the hydraulic turbine (11).

According to the seventh aspect, both the flow rate of the hydraulic turbine (11) and the electric power generated by the generator (12) can be brought close to the desired target value.

According to the seventeenth aspect, both the pressure of the fluid downstream of the hydraulic turbine (11) and the electric power generated by the generator (12) can be brought close to the desired target value.

According to the eighth aspect, occurrence of hunting of the operation point of the hydraulic turbine (11) can be substantially avoided, and the convergence of the flow rate control and the generated electric power control can be improved.

According to the eighteenth aspect, occurrence of hunting of the operation point of the hydraulic turbine (11) can be substantially avoided, and the convergence of the pressure control and the generated electric power control can be improved.

According to the ninth and nineteenth aspects, it is possible to obtain the maximum generated electric power in the generator (12).

DESCRIPTION OF EMBODIMENTS

Embodiments of the present invention will be described in detail below with reference to the drawings. The embodiments below are merely exemplary ones in nature, and are not intended to limit the scope, applications, or use of the present invention.

First Embodiment

Figure 1:
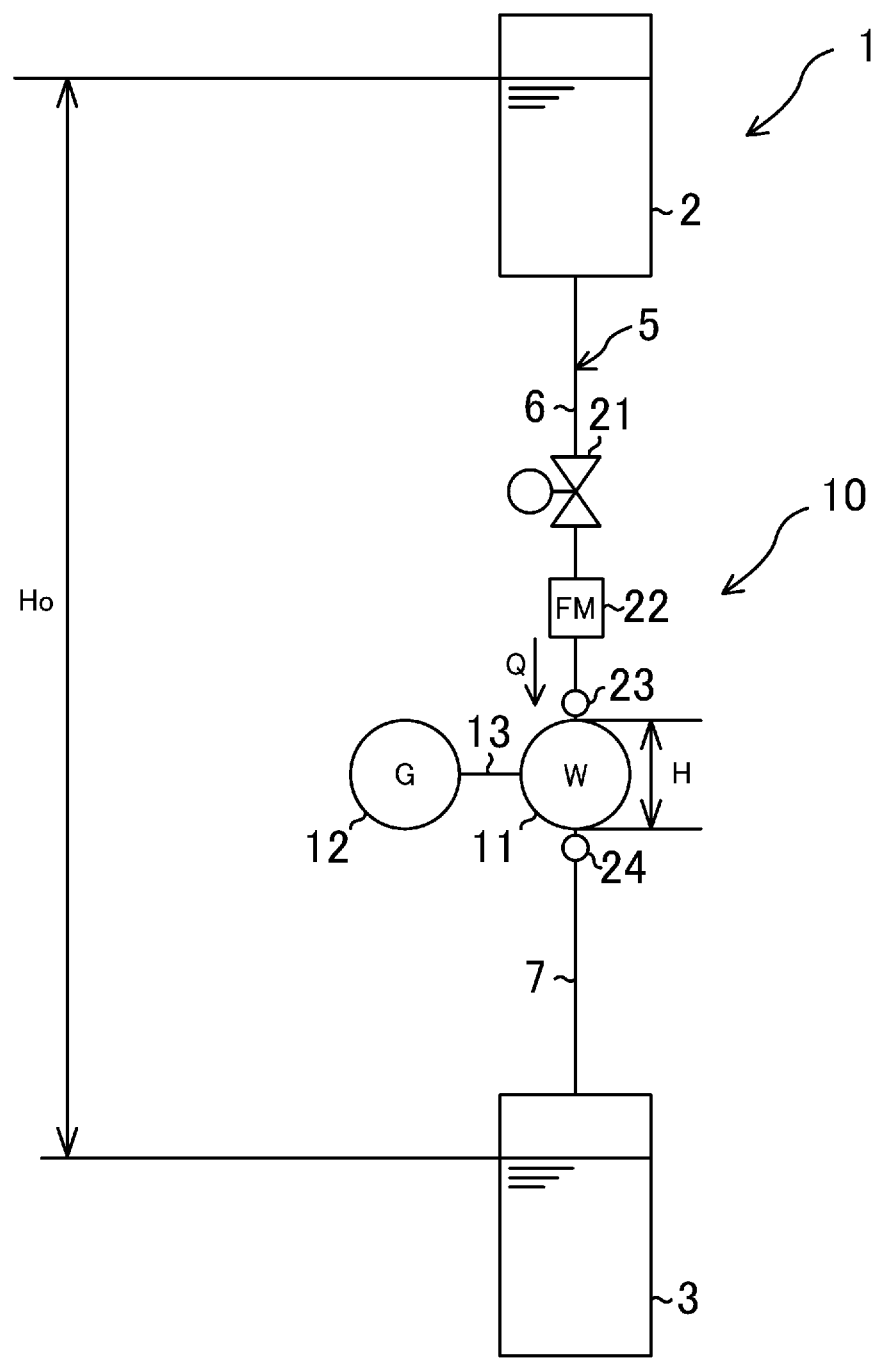
FIG. 1 is a diagram schematically illustrating an overall configuration of a hydroelectric power generation system including a pipe according to a first embodiment.

As shown in FIG. 1, a hydroelectric power generation system (10) according to a first embodiment of the present invention is applied to, e.g., a waterworks (1). The waterworks (1) is provided with a storage tank (2), a water receiving tank (3) disposed downstream of the storage tank (2), and a pipe (5) (channel) connecting the storage tank (2) and the water receiving tank (3) together. The pipe (5) is a waterway through which water flows with a head. The pipe (5) includes an inflow-side pipe (6) upstream of a hydraulic turbine (11) of the hydroelectric power generation system (10), and an outflow-side pipe (7) downstream of the hydraulic turbine (11). The inflow-side pipe (6) is connected to the storage tank (2) and the hydraulic turbine (11), and the outflow-side pipe (7) is connected to the hydraulic turbine (11) and the water receiving tank (3).

Figure 2:
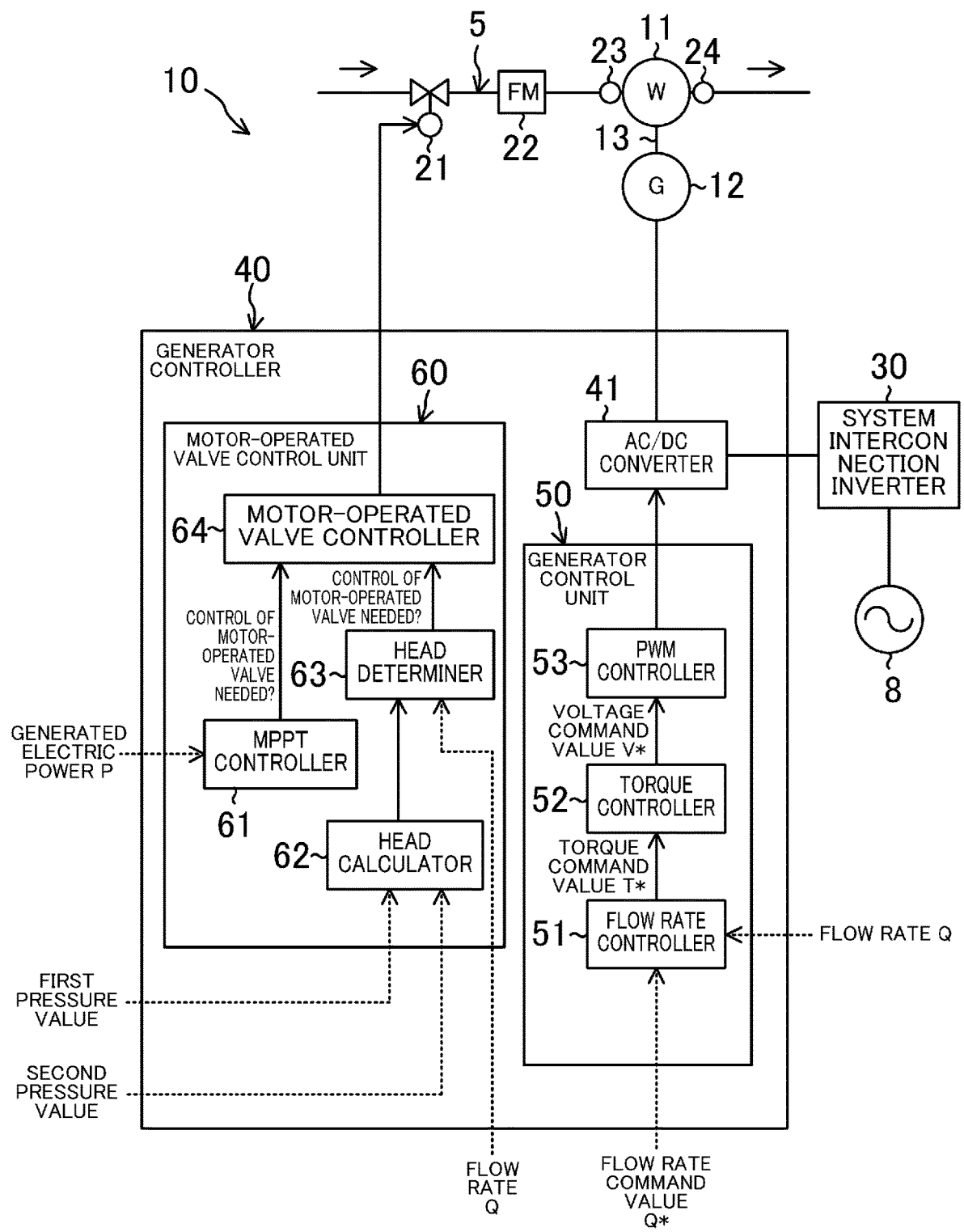
FIG. 2 is a diagram illustrating an electric power system of the hydroelectric power generation system.

As shown in FIG. 1, the hydroelectric power generation system (10) of this embodiment includes a hydraulic turbine (11), a generator (12), a motor-operated valve (21), a flowmeter (22), a first pressure sensor (23), and a second pressure sensor (24). As shown in FIG. 2, the hydroelectric power generation system (10) includes a generator controller (40) and a system interconnection inverter (30).

<Hydraulic Turbine>

The hydraulic turbine (11) is disposed midway of the pipe (5). The hydraulic turbine (11) includes a casing and a vane wheel housed in the casing (none of which is shown). An impeller of a volute pump is used as the vane wheel. A shaft (13) is fixed to the center portion of the impeller. In the hydraulic turbine (11), the impeller is rotated by the water flow from a fluid inflow port of the casing, and along with the rotation, the shaft (13) is driven to rotate.

<Generator>

The generator (12) is connected to the shaft (13) of the hydraulic turbine (11). When the shaft (13) of the hydraulic turbine (11) is rotated, the generator (12) is driven to generate electric power. The generator (12) in this embodiment includes a permanent magnet embedded rotor and a stator having a coil (not shown). As shown in FIG. 2, the electric power generated by the generator (12) is supplied to an electric power system (8) (a commercial power source) via an AC/DC converter (41) and the system interconnection inverter (30).

<Other Devices in Pipe>

The motor-operated valve (21), the flowmeter (22), and the first pressure sensor (23) are connected to the inflow-side pipe (6) in this order in the flow direction. The motor-operated valve (21) adjusts the pressure in the pipe (5) by driving its valve body with an electric motor. That is to say, the motor-operated valve (21) constitutes a pressure control valve. When the opening degree of the motor-operated valve (21) is adjusted, an effective head (H) of the hydraulic turbine (11) is changed. That is to say, the motor-operated valve (21) constitutes a head adjuster for adjusting the effective head (H) of the hydraulic turbine (11).

A flowmeter (22) detects the flow rate (Q) of the water flowing through the hydraulic turbine (11). The first pressure sensor (23) is disposed at an inflow portion of the hydraulic turbine (11) to detect the pressure of the water flowing into the hydraulic turbine (11). The second pressure sensor (24) is connected to the outflow-side pipe (7). The second pressure sensor (24) is disposed at an outflow portion of the hydraulic turbine (11) to detect the pressure of the water flowing out of the hydraulic turbine (11).

<System Interconnection Inverter>

The system interconnection inverter (30) includes a plurality of switching elements which constitute an inverter unit. DC power from the generator controller (40) is input to the system interconnection inverter (30). By switching the plurality of switching elements, the DC power is converted into AC power. The AC power converted by the system interconnection inverter (30) is supplied (reversely flowed) to the electric power system (8).

<Generator Controller>

As shown in FIG. 2, the generator controller (40) (control unit) includes an AC/DC converter (41), a generator control unit (50), and a motor-operated valve control unit (60).

<AC/DC Converter>

The AC/DC converter (41) includes a plurality of switching elements, and converts the electric power (AC power) generated by the generator (12) into DC power by switching. The output of the AC/DC converter (41) is smoothed by a smoothing capacitor (not shown), and is output to the system interconnection inverter (30).

<Generator Control Unit>

In the first embodiment, the generator control unit (50) executes flow rate control so as to bring the flow rate (Q) of water flowing through the hydraulic turbine (11) close to a target flow rate. Here, the target flow rate is determined, for example, according to a request of a target to which water from the pipe (5) is supplied. The generator controller (40) receives a flow rate command value (Q*) corresponding to the target flow rate.

The generator control unit (50) includes a microcomputer and a memory device storing a program for operating the microcomputer. The generator control unit (50) includes a flow rate controller (51), a torque controller (52), and a PWM controller (53).

The flow rate control unit (51) receives the flow rate (Q) of the water detected by the flowmeter (22) and the flow rate command value (Q*) which is the target flow rate. Here, the flow rate command value (Q*) corresponds to the target flow rate described above. The flow rate controller (51) calculates a torque command value (T*) for converging the flow rate (Q) to the flow rate command value (Q*).

The torque controller (52) receives the torque command value (T*) which is a control target of the generator (12). The torque controller (52) calculates a voltage command value in accordance with the torque command value (T*).

The PWM controller (53) executes PWM control of the switching elements of the AC/DC converter (41) based on the voltage command value output from the torque controller (52). As a result, the flow rate (Q) converges to the flow rate command value (Q*).

<Motor-operated Valve Control Unit>

The motor-operated valve control unit (60) controls the opening degree of the motor-operated valve (21). Specifically, the motor-operated valve control unit (60) executes head adjusting control for adjusting the effective head (H) of the hydraulic turbine (11) using the motor-operated valve (21) such that the effective head (H) of the hydraulic turbine (11) falls within a first range. In the first embodiment, the first range is set to be a proper operation region. Here, the head adjusting control includes first control and second control. The first control is executed to return the operation point of the hydraulic turbine (11) from a cavitation region to the proper operation region. Specifically, in the first control, when the effective head (H) of the hydraulic turbine (11) is larger than the upper limit value (a first threshold value (Hoptmax1)) of the first range, the opening degree of the motor-operated valve (21) is reduced so as to reduce the effective head (H). The second control is executed to return the operation point of the hydraulic turbine (11) from a point on the operating limit curve to the proper operation region. Specifically, in the second control, when the effective head (H) of the hydraulic turbine (11) is smaller than the lower limit value (a second threshold value (Hoptmin1)) of the first range, the opening degree of the motor-operated valve (21) is increased so as to increase the effective head (H).

Furthermore, the motor-operated valve control unit (60) executes generated electric power control for adjusting the effective head (H) of the hydraulic turbine (11) using the motor-operated valve (21) such that the electric power generated by the generator (12) is brought close to a target generated electric power. In the generated electric power control according to this embodiment, the maximum electric power generated by the generator (12) is the target generated electric power. More specifically, in the generated electric power control in this embodiment, the opening degree of the motor-operated valve (21) is controlled using so-called maximum power point tracking (MPPT) control (hill-climbing method) such that the electric power generated by the generator (12) approaches the maximum generated electric power. Details of these control operations will be described later.

The motor-operated valve control unit (60) includes a microcomputer and a memory device storing a program for operating the microcomputer. The motor-operated valve control unit (60) includes a MPPT controller (61), a head calculator (62), a head determiner (63), and a motor-operated valve controller (64).

The MPPT controller (61) receives generated electric power (P) of the generator (12). The MPPT controller (61) is a control unit for executing the maximum power point tracking (MPPT) control. The MPPT controller (61) determines whether or not the opening degree of the motor-operated valve (21) needs to be controlled based on the generated electric power (P), and outputs a command value corresponding to the determination result.

Here, the generated electric power (P) of the generator (12) is obtained, for example, from the current value of the generator (12) and the voltage value of the generator (12), the power output from the AC/DC converter (41), and the power output from the system interconnection inverter (30). The generated electric power (P) can also be obtained from an instantaneous power value detected by a power meter in the electric power system (8), for example. Further, the generated electric power (P) can be obtained using, for example, a relational expression indicating a relationship between the operation point of the hydraulic turbine (11) and the generated electric power, and data (for example, a characteristic map (M) which will be described later) in which such a relationship is stored.

The head calculator (62) receives a pressure, detected by the first pressure sensor (23), of the water on an inflow side of the hydraulic turbine (11) (a first pressure value), and a pressure, detected by the second pressure sensor (24), of the water on an outflow side of the hydraulic turbine (11) (a second pressure value). The head calculator (62) obtains the effective head (H) of the hydraulic turbine (11) based on the difference between these pressure values (see FIG. 1).

The head determiner (63) determines whether or not the motor-operated valve (21) needs to be controlled based on the effective head (H) output from the head calculator (62) and the flow rate (Q), and outputs a command value corresponding to the determination result.

The motor-operated valve controller (64) adjusts the opening degree of the motor-operated valve (21) based on the command value output from the MPPT controller (61) and the command value output from the head determiner (63).

<Operation Parameters of Hydropower System>

The operating parameters of the hydroelectric power generation system (10) and their relationships will now be described in detail with reference to FIG. 3. In the graph (also referred to as a characteristic map (M)) shown in FIG. 3, the vertical axis represents the effective head (H) of the hydraulic turbine (11), and the horizontal axis represents the flow rate (Q) of the water flowing through the hydraulic turbine (11). Here, the effective head (H) of the hydraulic turbine (11) is obtained through subtraction of a head corresponding to a pipe resistance, while the water in the storage tank (2) flows to the water receiving tank (3) via the pipe (5), from a gross head (Ho) between the liquid level of the storage tank (2) and the liquid level of the water receiving tank (3).

Figure 3:
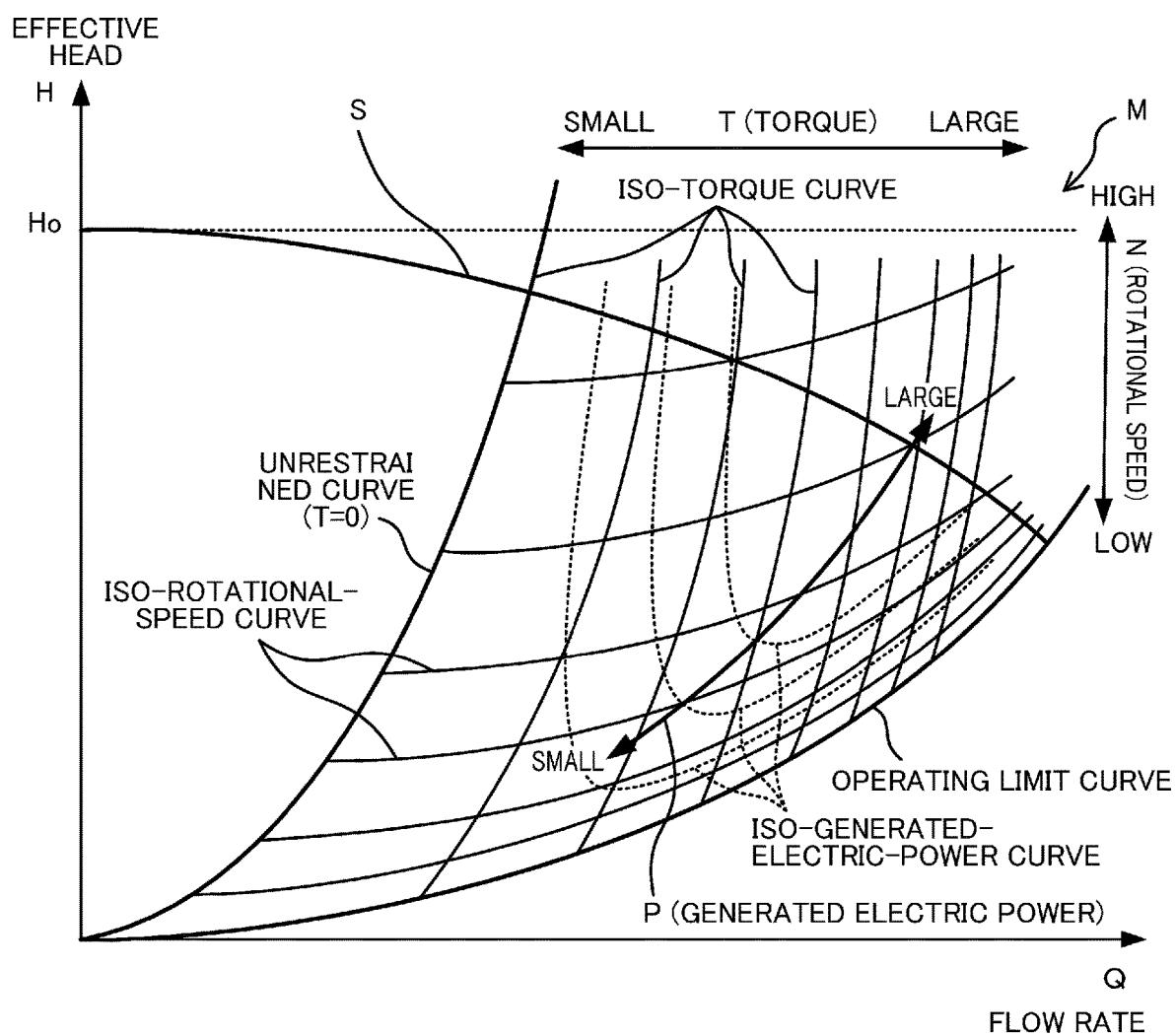
FIG. 3 is a graph showing a characteristic map of the hydroelectric power generation system.

The relationship between the effective head (H) and the flow rate (Q) can be represented by a flow resistance characteristic line (also referred to as a system loss curve (S)) shown in FIG. 3. The characteristics of the system loss curve (S) are that the effective head (H) when the flow rate (Q)=0 is the gross head (Ho), and that the effective head (H) is reduced in the second order curve in accordance with the increase in the flow rate (Q). The curvature of the system loss curve (S) has a value unique to the pipe (5) in FIG. 1. The flow rate (Q) in the pipe (5) included in the hydroelectric power generation system (10) and the effective head (H) at that time correspond to points on the system loss curve (S). That is to say, the point (the operation point of the hydraulic turbine (11)) corresponding to the flow rate (Q) and the effective head (H) of the hydraulic turbine (11) is always on the system loss curve (S).

In the characteristic map (M) of FIG. 3, the torque value (T) of the generator (12), the number of rotations (rotational speed) (N) of the generator (12), and the generated electric power (P) of the generator (12) are represented as the characteristics correlated with the flow rate (Q) and the effective head (H) in the hydraulic turbine (11).

In the characteristic map (M), a region (referred to as a hydraulic turbine region or an operable region) in which the hydraulic turbine (11) can be rotated by the water flow is formed between a curve (referred to as an unrestrained curve (T=0)) in which the torque value (T) of the generator (12) is 0 and a curve (referred to as an operating limit curve) in which the rotational speed (N) of the generator (12) is 0 or a predetermined minimum rotational speed. In FIG. 3, a region on the left of the unrestrained curve is a hydraulic turbine brake region (a power running region).

In the hydraulic turbine region, a plurality of iso-torque curves are provided along the unrestrained curve, and the torque value (T) also increases in accordance with the increase in the flow rate (Q) on the characteristic map (M). Further, a plurality of iso-rotational-speed curves are provided along the operating limit curve, and the rotational speed (N) increases with the increase in the effective head (H). On the system loss curve (S), the torque value (T) decreases with the decrease in the flow rate (Q). Further, on the system loss curve (S), the number of rotational speed (N) decreases with the increase in the flow rate (Q). An iso-generated-power curve indicated by a broken line is a curve convex downward, and the generated electric power (P) also increases with the increase in the effective head (H) and the flow rate (Q).

The relationship among the parameters in the characteristic map (M) described above can be stored in the memory device in the form of a table (numerical table) or a mathematical formula (function) in the program. Therefore, the generator controller (40) can perform various calculations and control using the relationship among the parameters represented in the characteristic map (M).

—Operation—

The operation of the hydroelectric power generation system (10) will now be described.

<Basic Flow>

Figure 4:
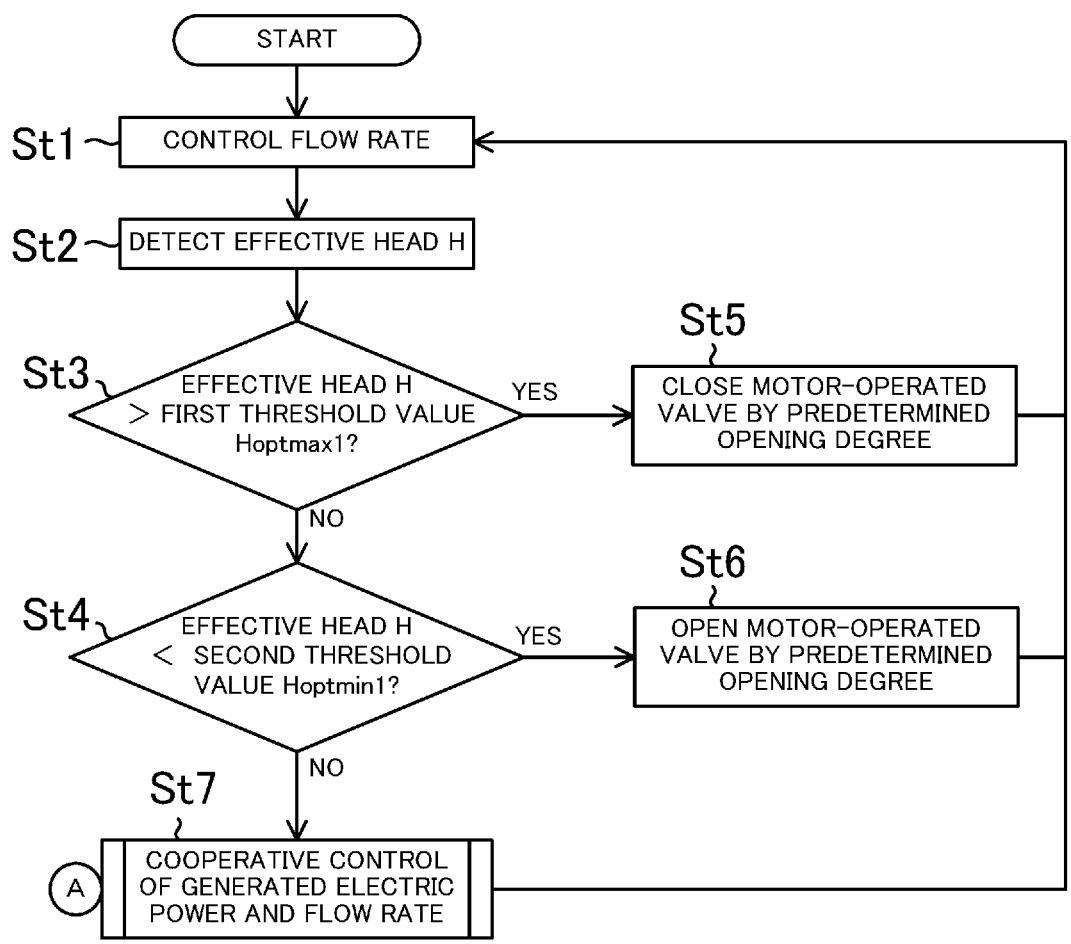
FIG. 4 is a basic flowchart of the operation of the hydroelectric power generation system.

First, the basic operation of the hydroelectric power generation system (10) will be described with reference to FIG. 4. In FIG. 4, when the operation of the hydroelectric power generation system (10) is started, flow rate control is executed to bring the flow rate (Q) in the hydraulic turbine (11) close to the target flow rate (Step St1. That is to say, in the flow rate control, the generator control unit (50) calculates the torque command value (T*) based on the current flow rate (Q) and the flow rate command value (Q*). The PWM controller (53) controls the switching elements of the AC/DC converter (41) based on the voltage command value calculated by the torque controller (52). This brings the flow rate (Q) in the hydraulic turbine (11) or the pipe (5) close to the flow rate command value (Q*).

Next, in Step St2, the head calculator (62) detects the effective head (H) of the hydraulic turbine (11). In Step St3, the effective head (H) is compared with the first threshold value (Hoptmax1). Here, the first threshold value (Hoptmax1) is a determination value for determining whether or not the operation point of the hydraulic turbine (11) has reached the cavitation region, and is the upper limit value of the first range. In Step St3, if the effective head (H) is larger than the first threshold value (Hoptmax1), it is determined that the operation point of the hydraulic turbine (11) is in the cavitation region, and the process moves to Step St5, where the opening degree of the motor-operated valve (21) is reduced by a predetermined opening degree (the first control). In other words, in the first control, the effective head (H) of the hydraulic turbine (11) is reduced. In Step St3, if the effective head (H) is smaller than the first threshold value (Hoptmax1), the process moves to Step St4.

In Step St4, the effective head (H) is compared with the second threshold value (Hoptmin1). Here, the second threshold value (Hoptmin1) is a determination value for determining whether or not the hydraulic turbine (11) has reached the operating limit curve, and is the lower limit value of the first range. In Step St4, if the effective head (H) is smaller than the second threshold value (Hoptmin1), it is determined that the operation point of the hydraulic turbine (11) has reached the operating limit curve, and the process moves to Step St6, where the opening degree of the motor-operated valve (21) is increased by a predetermined opening degree (the second control). In other words, in the second control, the effective head (H) of the hydraulic turbine (11) is increased. In Step St4, if the effective head (H) is larger than the second threshold value (Hoptmin1), the process moves to Step St7, and cooperative control of generated electric power and flow rate is executed.

When the opening degree of the motor-operated valve (21) is adjusted in Steps St5 and St6, the flow rate control is not executed, and the torque value of the generator (12) is not controlled. That is to say, the flow rate control in Step St1 is executed after the completion of the adjustment of the opening degree of the motor-operated valve (21).

<First Control>

The first control is executed to reduce the occurrence of cavitation inside the hydraulic turbine (11). The problem of the cavitation and the control for solving the cavitation will be described in detail with reference to FIGS. 5 to 9.

Figure 5:
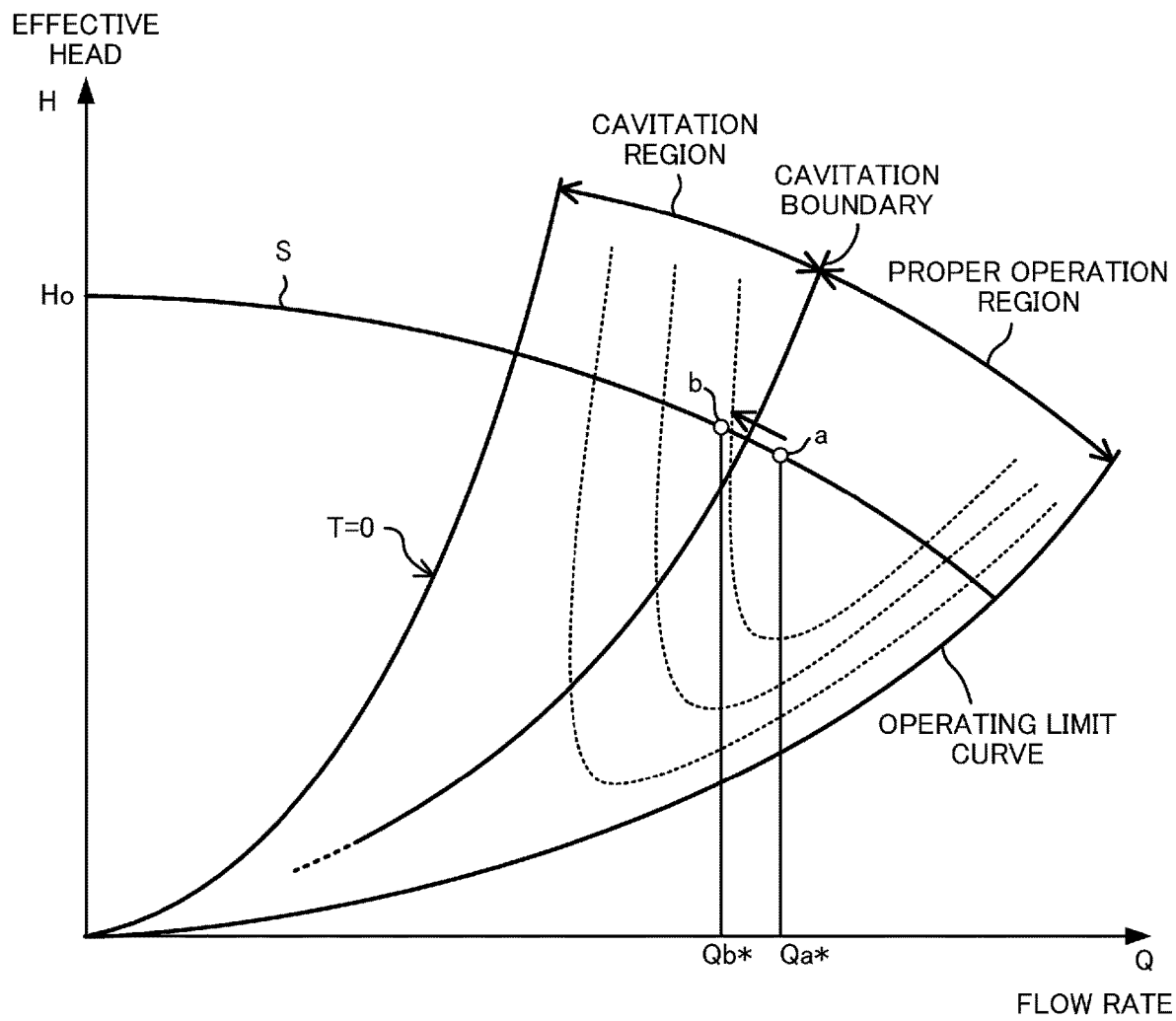
FIG. 5 is a characteristic map for explaining a first example in which the operation point of the hydraulic turbine shifts to the cavitation region.

For example, as shown in FIG. 5, the operating region of the hydraulic turbine (11) includes a region where cavitation may occur (referred to as a cavitation region) and a region where the cavitation does not occur and normal operation is executed (referred to as a proper operation region). Here, cavitation is a phenomenon (a cavity phenomenon) in which, since a fluid is accelerated inside a hydraulic turbine, the pressure of the fluid is decreased to be close to a saturated vapor pressure, and a large number of vapor bubbles are generated. When a large number of vapor bubbles are generated in association with the occurrence of cavitation, and then, these vapor bubbles disappear, a very high pressure of several tens of thousands of atmospheres is locally generated. As a result, this causes problems such as deterioration of the performance of the hydraulic turbine (11), damage to the surface of the hydraulic turbine (11), and generation of vibration and noise.

In FIG. 5, the boundary between the cavitation region and the proper operation region is referred to as a cavitation boundary. The cavitation boundary can be obtained using a relational expression including a critical cavitation coefficient.

FIG. 5 shows an example in which the operation point of the hydraulic turbine (11) has reached the cavitation region due to the flow rate control described above. In other words, in the flow rate control described above, the generator (12) is controlled such that the flow rate (Q) of the hydraulic turbine (11) approaches the predetermined flow rate command value (Q*). For example, if the flow rate command value is Qa* in FIG. 5, the operation point of the hydraulic turbine (11) converges to point a. On the other hand, it is assumed that the target flow rate of the pipe (5) is further reduced, and the flow rate command value is reduced from Qa* to Qb* in FIG. 5. In this case, the operation point of the hydraulic turbine (11) moving on the system loss curve (S)

moves from point a to point b in FIG. 5. As a result, the operation point of the hydraulic turbine (11) reaches the cavitation region from the proper operation region.

Figure 6:
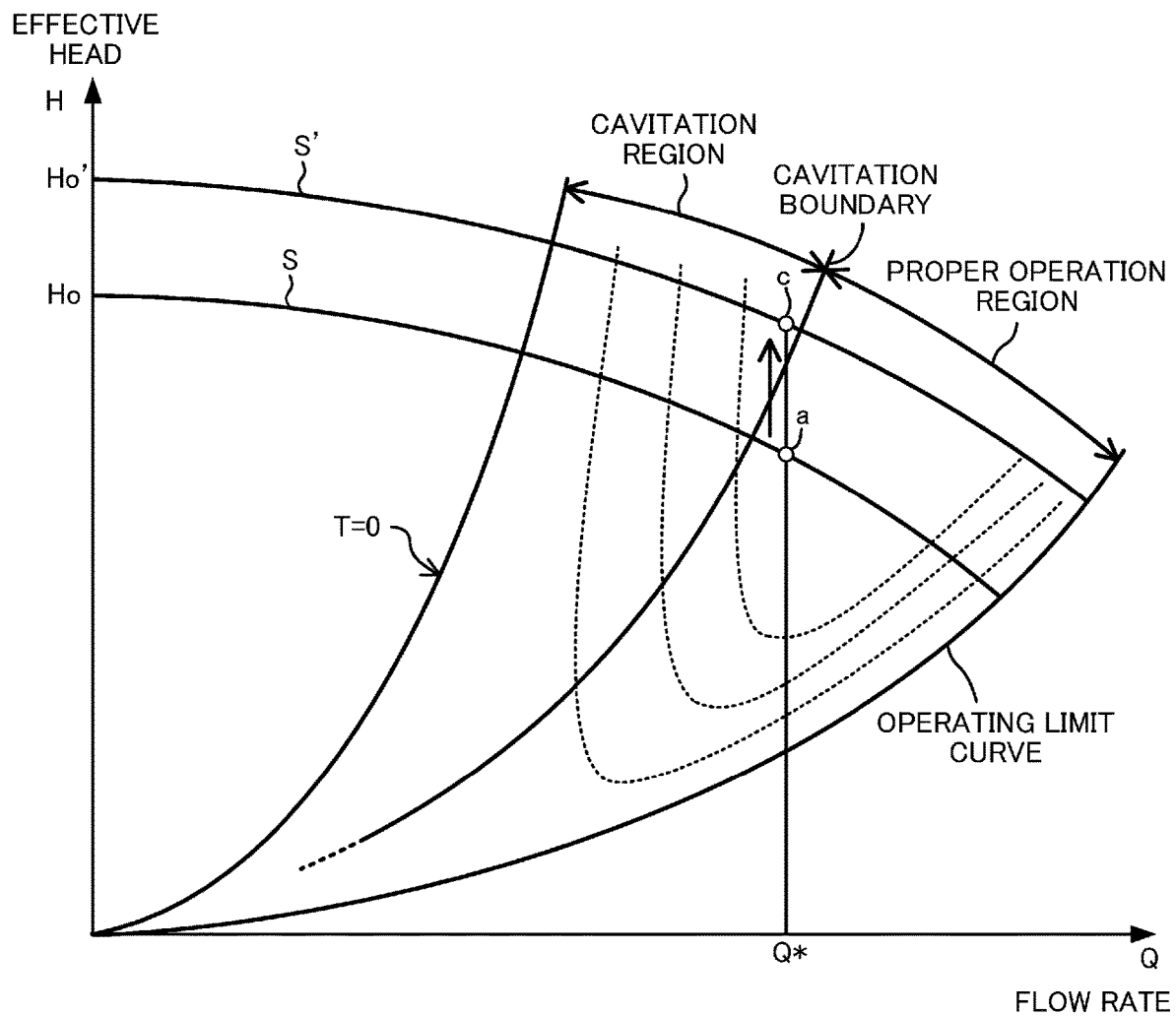
FIG. 6 is a characteristic map for explaining a second example in which the operation point of the hydraulic turbine shifts to the cavitation region.

FIG. 6 shows another example in which the operation point of the hydraulic turbine (11) has reached the cavitation region. In the flow rate control described above, it is assumed that the flow rate (Q) in the hydraulic turbine (11) converges to the flow rate command value (Q*). At this time, if the system loss curve is S in FIG. 6, the operation point of the hydraulic turbine (11) is point a in FIG. 6. If the water level of the storage tank (2) rises or the water level of the water receiving tank (3) decreases from this state, the gross head (Ho) of the pipe (5) increases from Ho to Ho' in FIG. 6. As a result, the system loss curve is also shifted upward from S to S' in FIG. 6, and the operation point of the hydraulic turbine (11) moves from point a to point c in FIG. 6. As a result, the operation point of the hydraulic turbine (11) reaches the cavitation region from the proper operation region.

Figure 7:
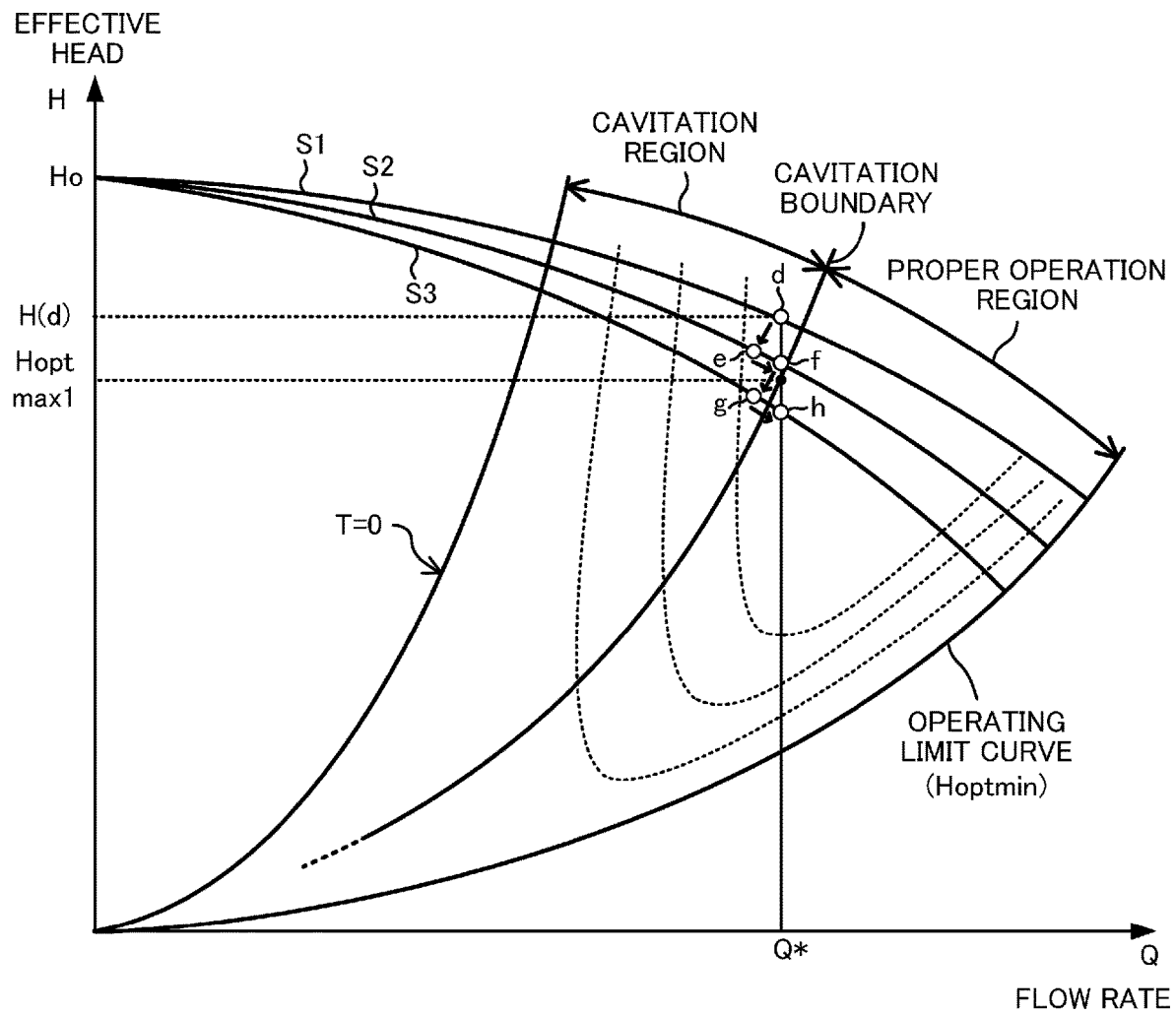
FIG. 7 is a characteristic map for explaining the operation of cooperatively executing first control and flow rate control.

Therefore, in this embodiment, the first control is executed in order to reduce the occurrence of such cavitation. Specifically, it is assumed that, for example, as shown in FIG. 7, in a state where the system loss curve is S1 and the flow rate command value is Q*, the operation point (point d) of the hydraulic turbine (11) has reached the cavitation region. In this case, the effective head (H) detected in Step St2 in FIG. 4 is H(d) in FIG. 7. Next, in Step St3, the effective head H(d) is compared with the first threshold value (Hoptmax1) in size. Here, as shown in FIG. 7, the first threshold value (Hoptmax1) is an effective head corresponding to the intersection point between the curve indicating the cavitation boundary and the flow rate command value (Q*), and can be obtained from the characteristic map (M) or from an expression or table representing the relationship among, the cavitation boundary, the flow rate, and the effective head. That is to say, the first threshold value (Hoptmax1) is a variable that changes in accordance with the flow rate command value (Q*).

In the example shown in FIG. 7, if the operation point of the hydraulic turbine (11) is at point d, the effective head (H) is larger than the first threshold value (Hoptmax1), and therefore, the process moves to Step St5. As a result, the motor-operated valve control unit (60) reduces the opening degree of the motor-operated valve (21) to a predetermined opening degree (first control). If the opening degree of the motor-operated valve (21) is reduced by the predetermined opening degree, a head corresponding to the resistance of the pipe (5) becomes large, and thus, the effective head (H) of the hydraulic turbine (11) becomes small. In addition, the flow rate in the pipe (5) and in the hydraulic turbine (11) is also reduced. As a result, the operation point of the hydraulic turbine (11) transitions from point d to point e, for example.

After Step St5, the process moves to Step St1, and the flow rate control is executed again. As described above, the opening degree of the motor-operated valve (21) becomes small, and the operation point of the hydraulic turbine (11) reaches point e, such that the flow rate (Q) in the hydraulic turbine (11) becomes smaller than the flow rate command value (Q*). However, after the first control, the flow rate control is executed, such that the operation point of the hydraulic turbine (11) moves on the system loss curve S2, and the flow rate (Q) in the hydraulic turbine (11) converges again to the flow rate command value (Q*). As a result, the operation point of the hydraulic turbine (11) is moved from point e to point f in FIG. 7.

If the process moves to Step St3 again, the effective head (H) of the hydraulic turbine (11) at point f is still larger than the first threshold value (Hoptmax1). Therefore, the process moves to Step St5, and the opening degree of the motor-operated valve (21) is reduced by the predetermined opening degree. As a result, the effective head (H) and the flow rate (Q) in the hydraulic turbine (11) are further reduced, and the operation point of the hydraulic turbine (11) reaches point g.

If the process moves to Step St1 again and the flow rate control is executed again, the operation point of the hydraulic turbine (11) moves on a system loss curve S3, and the flow rate (Q) of the hydraulic turbine (11) converges again to the flow rate command value (Q*). As a result, the operation point of the hydraulic turbine (11) is moved from point g to point h in FIG. 7.

If the process moves to Step St3 again, the effective head (H) of the hydraulic turbine (11) at point g is smaller than the first threshold value (Hoptmax1). Therefore, the process does not move to Step St5, and the first control is not executed.

As described above, in this embodiment, if a condition (a first condition) indicating that the operation point of the hydraulic turbine (11) is in the cavitation region is satisfied, the first control for reducing the opening degree of the motor-operated valve (21) (i.e., reducing the effective head (H)), and the flow rate control for bringing the flow rate (Q) in the hydraulic turbine (11) close to the target flow rate are cooperatively executed. This can return the operation point of the hydraulic turbine (11) to the proper operation region, and allows the flow rate (Q) in the hydraulic turbine (11) to converge to the flow rate command value (Q*). As shown in FIGS. 4 and 7, the first control and the flow rate control are alternately executed at different timings. If the first control and the flow rate control are executed at the same timing, hunting of the operation point of the hydraulic turbine (11) occurs. As a result, the operation point cannot quickly be moved to be in the proper operation region and quickly converge to the flow rate command value (Q*). In contrast, in this embodiment, since the timing of the start of the first control and the timing of the start of the flow rate control are shifted from each other. This improves the controllability of the operation point of the hydraulic turbine (11), and allows the operation point to quickly converge to the proper operation region and the flow rate command value (Q*).

In the first control, the fact that the effective head (H) is larger than the first threshold (Hoptmax1) is set to be the first condition for determining that the operation point of the hydraulic turbine (11) is in the cavitation region. Alternatively, other determination methods may be used as the first condition.

<Second Control>

The second control is executed to prevent the operation point of the hydraulic turbine (11) from staying on the operating limit curve. The problem of the operating limit curve and the control for solving the problem will be described with reference to FIGS. 8 and 9.

The operating limit curve is a boundary of the operation point at which it becomes impossible to adjust the flow rate (Q) in the hydraulic turbine (11) to the flow rate command value (Q*) by the generator (12) due to the rotational speed of the generator (12) reaching 0 or a predetermined minimum rotational speed. Therefore, if the operation point of the hydraulic turbine (11) reaches the operating limit curve, the flow rate control cannot be continuously executed thereafter.

Figure 8:
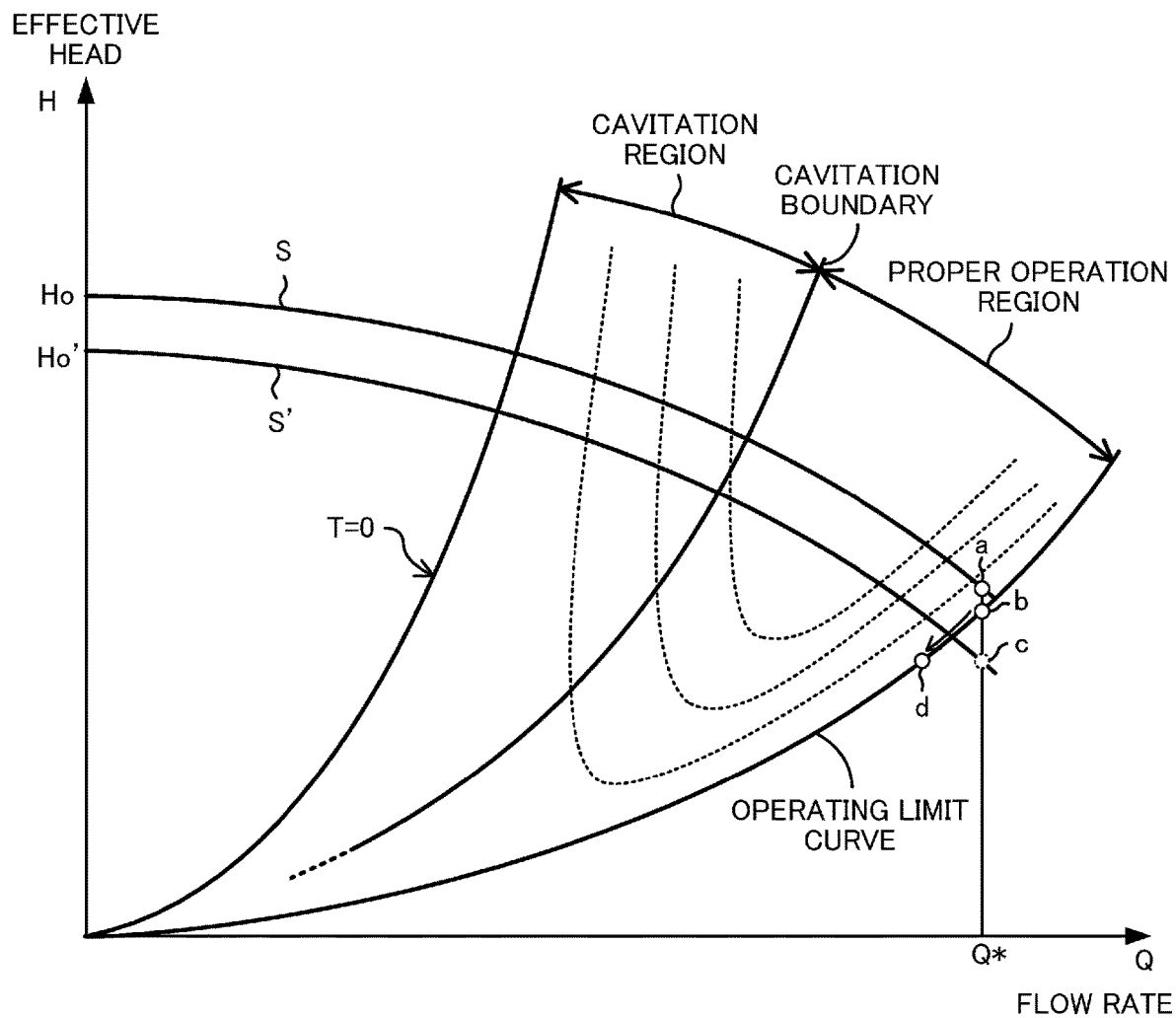
FIG. 8 is a characteristic map for explaining an example in which the operation point of the hydraulic turbine moves onto an operating limit curve.

For example, FIG. 8 shows an example in which the operation point of the hydraulic turbine (11) has reached the operating limit curve. In the flow rate control described above, it is assumed that the flow rate (Q) in the hydraulic turbine (11) converges to the flow rate command value (Q*). At this time, if the system loss curve is S in FIG. 8, the operation point of the hydraulic turbine (11) is point a in FIG. 8. In this state, for example, if the water level in the storage tank (2) decreases or the water level in the water receiving tank (3) rises, the gross head (Ho) of the conduit (5) decreases, and the gross head decreases from Ho to Ho' in FIG. 8. As a result, the system loss curve is shifted downward from S to S' in FIG. 8, and the operation point of the hydraulic turbine (11) is moved from point a to point c. However, if the operation point of the hydraulic turbine (11) reaches the operating limit curve (point b) along with the decrease in the effective head (H) of the hydraulic turbine (11), the flow rate (Q) in the hydraulic turbine (11) can no longer be controlled to the flow rate command value (Q*). As a result, in this example, the operation point of the hydraulic turbine (11) moves to a lower left portion on the operating limit curve. As a result, the operation point of the hydraulic turbine (11) moves from point b to the point d, not from point b to point c.

In this state, the flow rate (Q) in the hydraulic turbine (11) becomes smaller than the flow rate command value (Q*), so that it is impossible to satisfy the target flow rate. Further, if the operation point of the hydraulic turbine (11) is at point d, the flow rate of the hydraulic turbine (11) cannot be adjusted so as to be further increased. Therefore, in this state, the flow rate control cannot allow the flow rate (Q) in the hydraulic turbine (11) to converge to the flow rate command value (Q*). Therefore, in this embodiment, the second control is executed in order to prevent the operation point of the hydraulic turbine (11) from staying on the operating limit curve.

Figure 9:
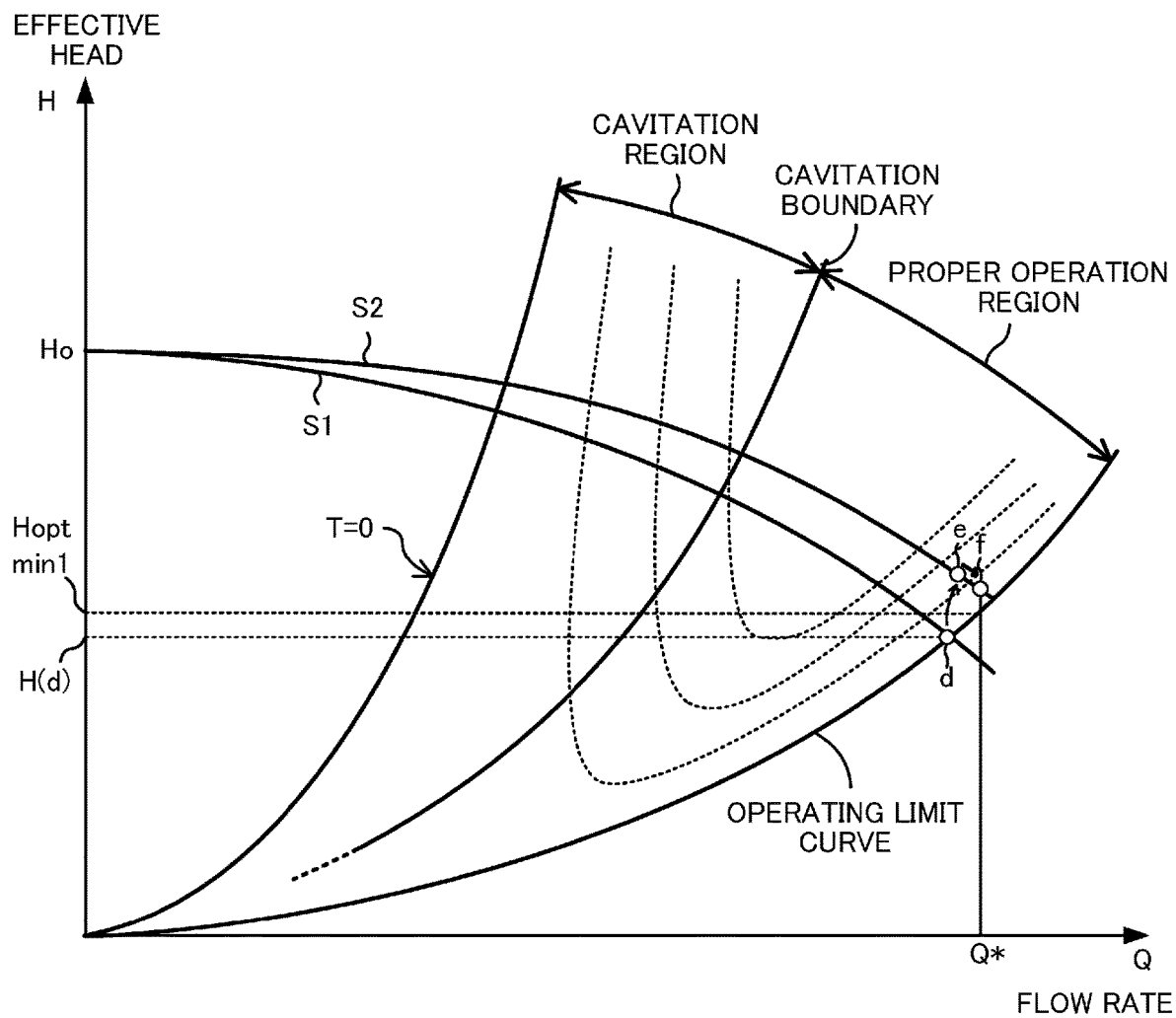
FIG. 9 is a characteristic map for explaining the operation of cooperatively executing second control and the flow rate control.

Specifically, for example, as shown in FIG. 9, it is assumed that the operation point of the hydraulic turbine (11) has reached point d on the operating limit curve. In this case, the effective head (H) detected in Step St2 in FIG. 4 is H(d) in FIG. 9. In Step St3, since the effective head H(d) is lower than the first threshold value (Hoptmax1), the process moves to Step St4. In Step St4, the effective head H(d) is compared with the second threshold value (Hoptmin1) in size. Here, the second threshold value (threshold value) (Hoptmin1) is an effective head corresponding to an intersection point between the operating limit curve and the flow rate command value (Q*), as shown in FIG. 9, and can be obtained from the characteristic map (M) or from an expression or table representing the relationship among, the operating limit curve, the flow rate, and the effective head. That is to say, the second threshold value (Hoptmin1) is a variable that changes in accordance with the flow rate command value (Q*).

In the example shown in FIG. 9, if the operation point of the hydraulic turbine (11) is at point d, the effective head (H) is smaller than the second threshold value (Hoptmin1), such that the process moves to Step St6. Accordingly, the motor-operated valve control unit (60) increases the opening degree of the motor-operated valve (21) by a predetermined opening degree (the second control). If the opening degree of the motor-operated valve (21) is increased by the predetermined opening degree, the head corresponding to the resistance of the pipe (5) becomes small, and eventually, the effective head (H) of the hydraulic turbine (11) becomes large. In addition, the flow rate in the pipe (5) and in the hydraulic turbine (11) is also increased. As a result, the operation point of the hydraulic turbine (11) returns to the proper operation region above the operating limit curve (for example, the operation point e in FIG. 9). After that, if the flow rate control is executed in Step St1, the operation point of the hydraulic turbine (11) is moved on the system loss curve S2, and the flow rate (Q) is adjusted to the flow rate command value (Q*). Accordingly, the operation point of the hydraulic turbine (11) is moved to point f in FIG. 9. Since the effective head (H) of the hydraulic turbine (11) at point f is larger than the second threshold value (Hoptmin1), the second control is not executed thereafter.

As described above, in this embodiment, if a condition (a second condition) indicating that the operation point of the hydraulic turbine (11) is on the operating limit curve is satisfied, the second control for increasing the opening degree of the motor-operated valve (21) (i.e., increasing the effective head (H)), and the flow rate control for bringing the flow rate of the hydraulic turbine (11) close to the target flow rate are cooperatively executed. This can return the operation point of the hydraulic turbine (11) to the proper operation region, and allows the flow rate (Q) in the hydraulic turbine (11) to converge to the flow rate command value (Q*). As shown in FIGS. 4 and 9, the second control and the flow rate control are alternately executed at different timings. If the second control and the flow rate control are executed at the same timing, hunting of the operation point of the hydraulic turbine (11) occurs. As a result, the operation point cannot quickly be moved to be in the proper operation region and quickly converge to the flow rate command value (Q*). In contrast, in this embodiment, since the timing of the start of the second control and the start of the flow rate control are shifted from each other. This improves the controllability of the operation point of the hydraulic turbine (11), and allows the operation point to converge quickly to the proper operation region and the flow rate command value (Q*).

Note that in the second control, the fact that the effective head (H) is smaller than the second threshold value (Hoptmin1) is set to be the second condition for determining that the operation point of the hydraulic turbine (11) is on the operating limit curve. Alternatively, other determination methods may be used as the second condition.

<Cooperative Control of Generated Electric Power and Flow Rate>

In FIG. 4, if it is determined that the effective head (H) is between the first threshold value (Hoptmax1) and the second threshold value (Hoptmin1), and the operation point of the hydraulic turbine (11) is in the proper operation region, the process moves to Step St7, where the cooperative control of generated electric power and flow rate is executed. The cooperative control of generated electric power and flow rate will be described with reference to FIGS. 10 to 13.

Figure 10:
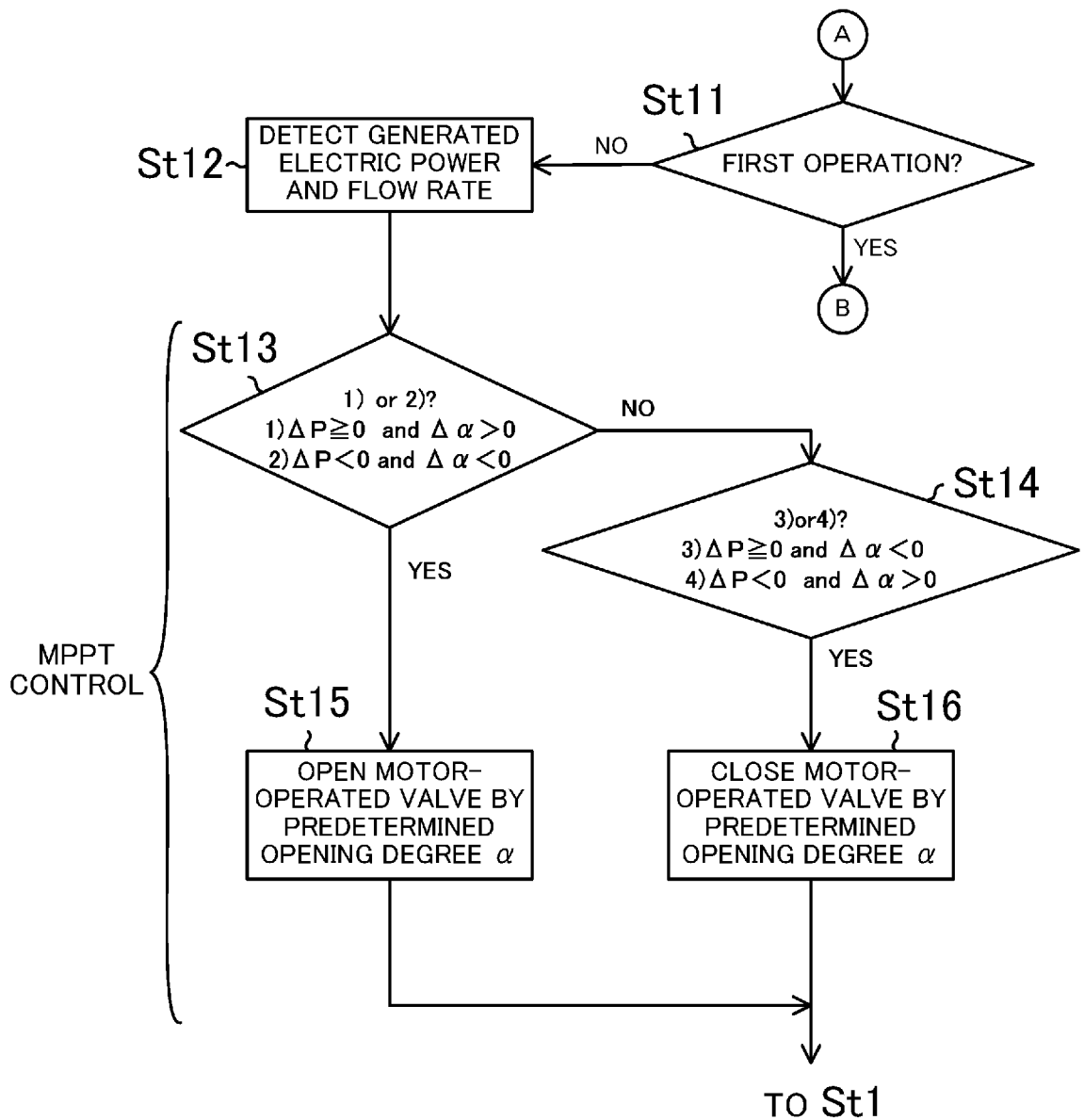
FIG. 10 is a basic flowchart of cooperative control of flow rate and generated electric power.

As shown in FIG. 10, in the cooperative control of generated electric power and flow rate, the flow rate control and the MPPT control (generated electric power control) are cooperatively executed. In Step St11 in FIG. 10, a determination is made whether or not the operation is a first operation of the cooperative control of generated electric power and flow rate. In the first operation, the process moves to B (Step St21 in FIG. 11). In Step St21, the generated electric power (P) and the flow rate (Q) are detected. The method for detecting the generated electric power (P) and the flow rate (Q) is as described above. Then, in Step St22, when the opening degree of the motor-operated valve (21) is 100% (fully opened), the opening degree of the motor-operated valve (21) is reduced by a predetermined opening degree, and if not, the opening degree of the motor-operated valve (21) is increased. Thereafter, the process returns to Step St1 in FIG. 4 again.

After the operation B is completed, the process moves from Step St11 to Step St12, where the generated electric power (P) and the flow rate (Q) are detected.

Figure 11:
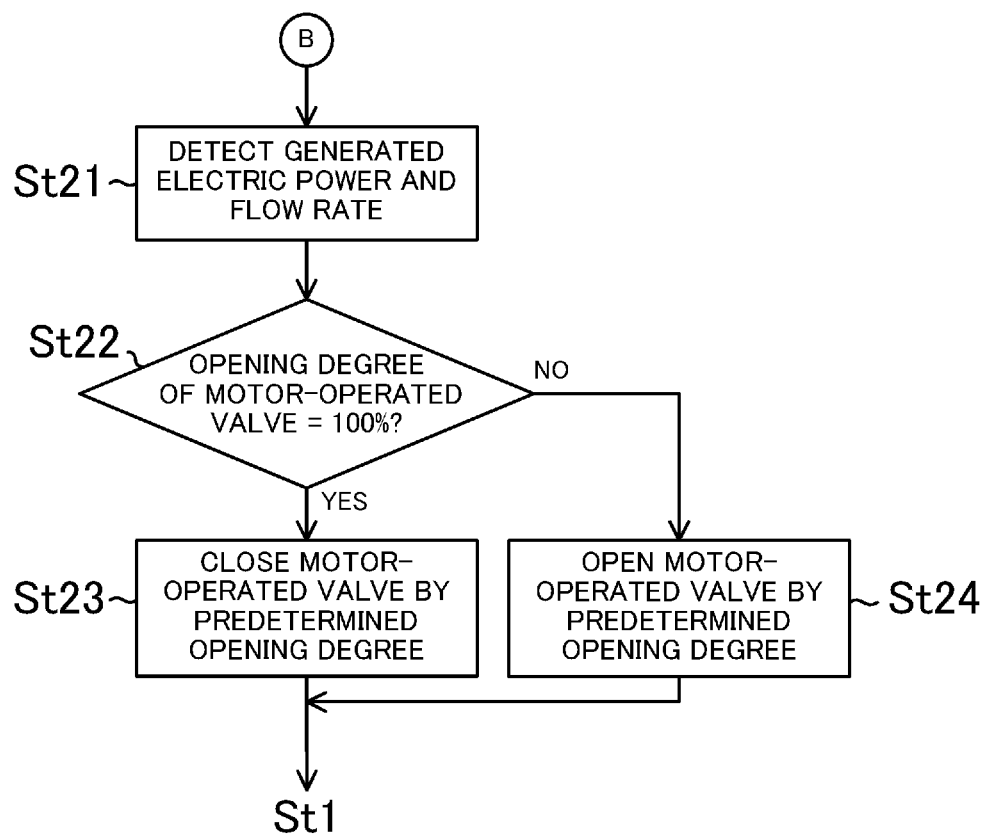
FIG. 11 is a flowchart of a part of first cooperative control of flow rate and generated electric power.

Next, in Step St13 to St16, the magnitude of the difference ΔP between the generated electric power detected in the current time and the generated electric power detected in the previous time, and the magnitude of the difference Δα between the opening degree of the motor-operated valve (21) in the current time and the opening degree of the motor-operated valve (21) in the previous time are determined. In the first MPPT control, the generated electric power (P) and the flow rate (Q) detected in Step St21 in FIG. 11 are the previous values, and the generated electric power (P) and flow rate (Q) detected in Step St12 in FIG. 10 are the current values. Based on these results, the opening degree of the motor-operated valve (21) is adjusted to increase the generated electric power (P).

Specifically, in Step St13, if 1) the ΔP is larger than or equal to 0 and the Δα is larger than 0, or 2) the ΔP is less than 0 and the Δα is less than 0, it can be determined that the generated electric power (P) can be increased by increasing the opening degree of the motor-operated valve (21). Accordingly, in this case, the motor-operated valve control unit (60) increases the opening degree of the motor-operated valve (21) by the predetermined opening degree a (Step St15).

In Step St14, if 3) the ΔP is equal to or larger than 0, the Δα is less than 0, or 4) the ΔP is less than 0 and the Δα is larger than 0, it can be determined that the generated electric power (P) can be increased by reducing the opening degree of the motor-operated valve (21). Accordingly, in this case, the motor-operated valve control unit (60) reduces the opening degree of the motor-operated valve (21) by the predetermined opening degree a (Step St16).

When the opening degree of the motor-operated valve (21) is adjusted in this manner, the flow returns to Step St1 in FIG. 4, and the flow rate control is executed. When the opening degree of the motor-operated valve (21) is adjusted by the MPPT control, the flow rate in the hydraulic turbine (11) is changed. However, this flow rate control allows the flow rate (Q) in the hydraulic turbine (11) to converge quickly to the flow rate command value (Q*). Thereafter, the generated electric power (P) and the flow rate (Q) are detected again (Step St12), and then, the MPPT control is executed again to adjust the opening degree of the motor-operated valve (21). In the control of the opening degree of the motor-operated valve (21) in Steps St15 and St16, the flow rate control is not executed, and the torque value of the generator (12) is not controlled. That is to say, the flow rate control in Step St1 is executed after the completion of the adjustment of the opening degree of the motor-operated valve (21).

In the MPPT control, such steps are repeated, and as a result, the generated electric power (P) converges to the maximum generated electric power, and the flow rate (Q) in the hydraulic turbine (11) converges to the flow rate command value (Q*). This operation will be described in more detail with reference to FIGS. 12 and 13.

For example, it is assumed that the operation point of the hydraulic turbine (11) is at point a. In this case, the flow rate (Q) in the hydraulic turbine (11) converges to the flow rate command value (Q*), but the generated electric power (P) does not reach the maximum generated electric power. If the MPPT control is executed from this state, the opening degree of the motor-operated valve (21) is increased by a. Thereafter, after the flow rate control is executed to allow the flow rate (Q) in the hydraulic turbine (11) to converge to the flow rate command value (Q*) and the operation point of the hydraulic turbine (11) to reach point b, the generated electric power (P) changes and increases from Pa to Pb in FIG. 13.

Figure 12:
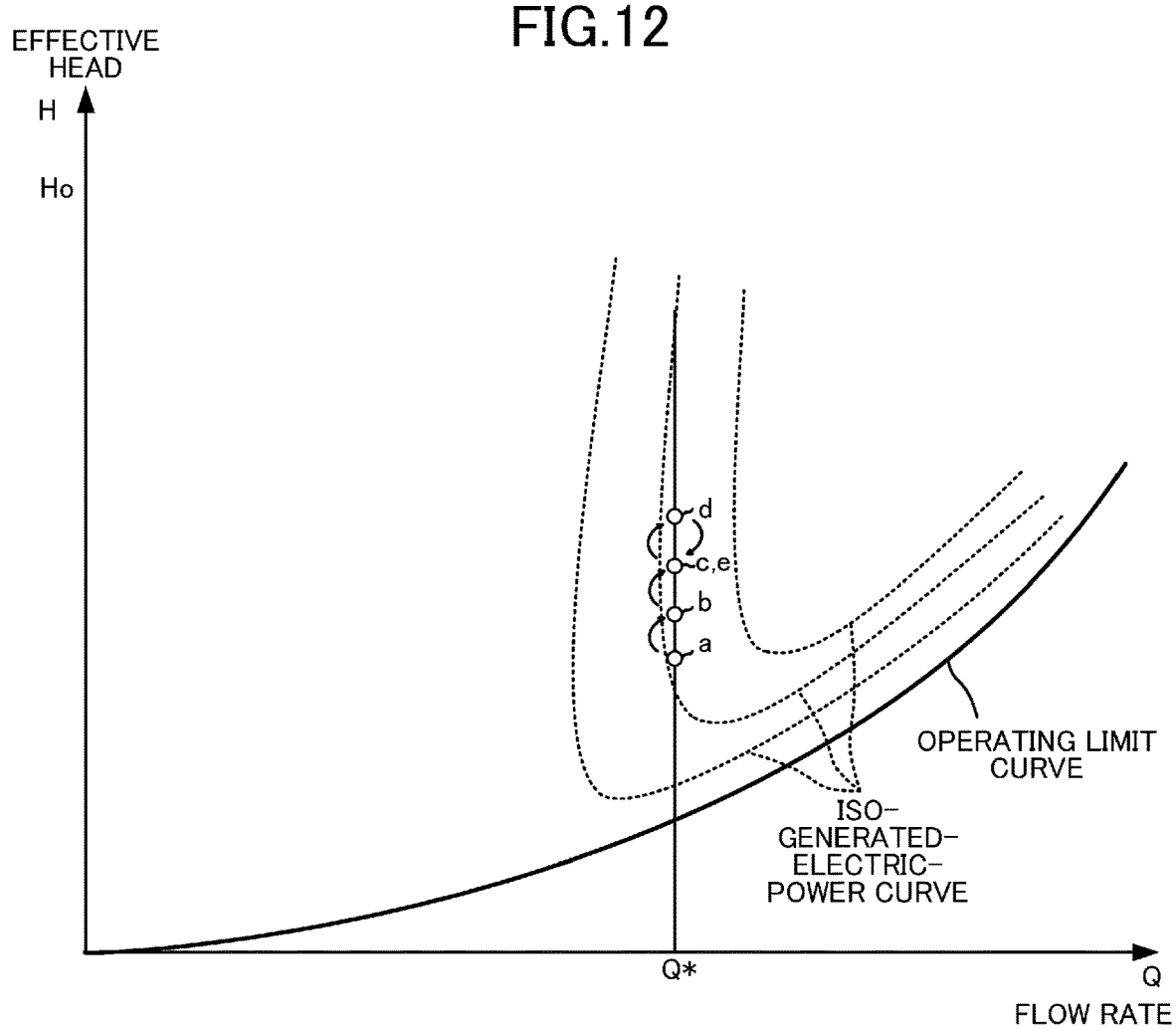
FIG. 12 is a characteristic map for explaining the transition of the operation point of the hydraulic turbine in an MPPT control.
Figure 13:
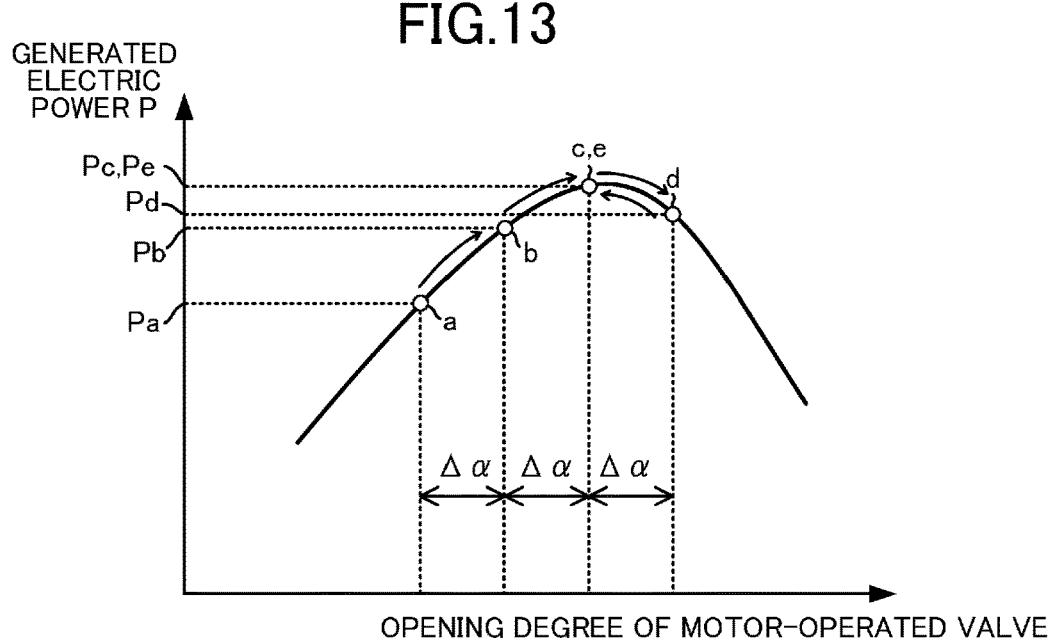
FIG. 13 is a graph for explaining the transition of the generated electric power and the opening degree of a motor-operated valve in the MPPT control.

In the operation in which the operation point moves from point a to point b as shown in FIG. 12, Δα>0 and ΔP≥0 are satisfied. Therefore, in the next MPPT control, the opening degree of the motor-operated valve (21) is further increased by α. After that, when the flow rate control is executed, the operation point of the hydraulic turbine (11) reaches point c, and the generated electric power (P) is increased from Pb to Pc in FIG. 13. In the operation in which the operation point moves from point b to point c as shown in FIG. 12, Δα>0 and ΔP≥0 are satisfied. Therefore, in the next MPPT control, the opening degree of the motor-operated valve (21) is further increased by a. Thereafter, when the flow rate control is executed, the operation point of the hydraulic turbine (11) reaches point d, and the generated electric power (P) decreases from Pc to Pd in FIG. 13.

In the operation in which the operation point moves from point c to point d as shown in FIG. 12, α>0 and ΔP<0 are satisfied. Therefore, in the next MPPT control, the opening degree of the motor-operated valve (21) is reduced by α. Thereafter, when the flow rate control is executed, the operation point of the hydraulic turbine (11) reaches point e, and the generated electric power (P) converges to the point or a region corresponding to the maximum generated electric power in FIG. 13.

As described above, in the hydroelectric power generation system (10) of this embodiment, the flow rate control and the MPPT control are cooperatively executed. This allows the generated electric power (P) to converge to the maximum generated electric power, and the flow rate (Q) in the hydraulic turbine (11) to converge to the flow rate command value (Q*). Further, as shown in FIG. 10, the flow rate control and the MPPT control are alternately executed at different timings. If the flow rate control and the MPPT control are executed at the same timing, hunting of the operation point of the hydraulic turbine (11) occurs. As a result, the operation point of the hydraulic turbine (11) cannot quickly converge to an operation point at which the generated electric power is the maximum generated electric power or an operation point at which the flow rate command value (Q*) is satisfied. In contrast, in this embodiment, the timing of the start of the flow rate control and the timing of the start of the MPPT control are shifted from each other. This improves the controllability of the operation point of the hydraulic turbine (11), and allows the operation point to quickly converge to the operation point at which the maximum power generating power and the flow rate command value (Q*) are satisfied.

Advantages of First Embodiment

In the first embodiment, the first control for reducing the opening degree of the motor-operated valve (21) and the flow rate control are cooperatively executed when the operation point of the hydraulic turbine (11) is in the cavitation region. This allows the flow rate (Q) in the hydraulic turbine (11) to converge to the target flow rate, and reliably reduces the occurrence of cavitation near the hydraulic turbine (11).

The timing for executing the first control and the timing for executing the flow rate control are shifted from each other. This can substantially avoid the occurrence of hunting of the operation point of the hydraulic turbine (11), and improve the convergence of the flow rate control and of the first control.

When the operation point of the hydraulic turbine (11) reaches the operating limit curve, the second control for increasing the opening degree of the motor-operated valve

(21) and the flow rate control are cooperatively executed. This can quickly and substantially prevent the operation point of the hydraulic turbine (11) from staying on the operating limit curve while allowing the flow rate (Q) in the hydraulic turbine (11) to converge to the target flow rate.

The timing for executing the second control and the timing for executing the flow rate control are shifted from each other. This can substantially avoid the occurrence of hunting of the operation point of the hydraulic turbine (11), and improve the convergence of the flow rate control and of the second control.

In the first embodiment, the flow rate control for bringing the flow rate (Q) of the water flowing through the hydraulic turbine (11) close to the target flow rate, and the generated electric power control for adjusting the opening degree of the motor-operated valve (21) so as to bring the generated electric power (P) in the generator (12) close to the target electric power are cooperatively executed. Therefore, the flow rate (Q) in the hydraulic turbine (11) and the generated electric power (P) of the generator (12) can be brought close to the desired target value.

In the generated electric power control, the MPPT control is executed so as to bring the generated electric power (P) close to the maximum generated electric power. Therefore, the power generation efficiency of the generator (12) can be improved.

The timing for executing the flow rate control and the timing for executing the MPPT control are shifted from each other. This can substantially avoid the occurrence of hunting of the operation point of the hydraulic turbine (11), and improve the convergence of the flow rate control and of the MPPT control.

Variation of First Embodiment

A variation of the first embodiment is different from the first embodiment in the configuration of the motor-operated valve control unit (60). Specifically, the variation is different from the first embodiment in the operation at the time when the operation point of the hydraulic turbine (11) is in the cavitation region, and the operation at the time when the operation point of the hydraulic turbine (11) has reached the operating limit curve. The following description with reference to FIGS. 14 and 15 will be focused on only differences from the first embodiment.

Figure 14:
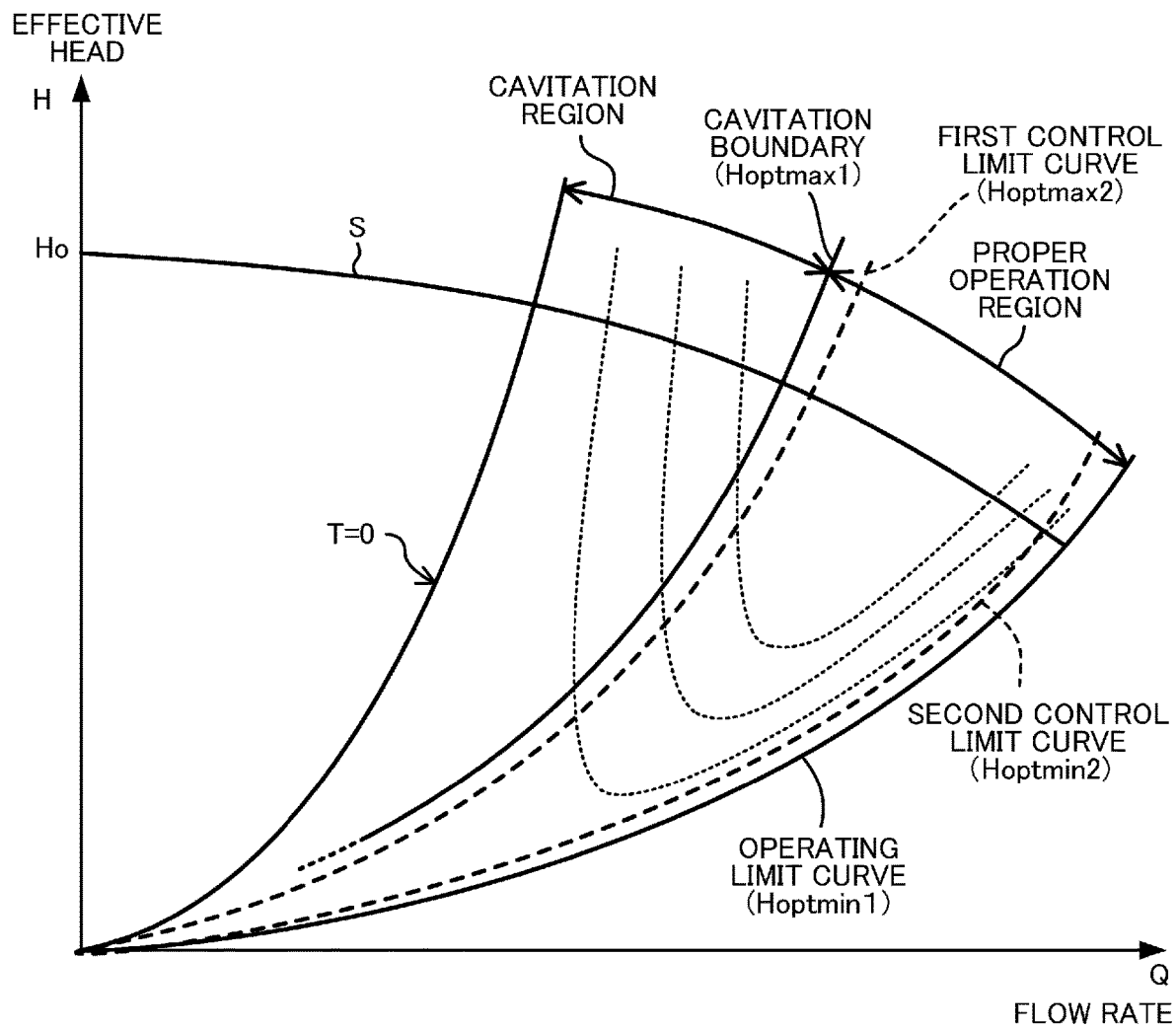
FIG. 14 is a characteristic map for explaining first and second control limit curves in a hydroelectric power generation system according to a variation of the first embodiment.

As shown in FIG. 14, in the variation of the first embodiment, a first control limit curve is defined near the cavitation boundary in the proper operation region. The first control limit curve is a curve adjacent to the cavitation boundary so as to be along the cavitation boundary. In the variation of the first embodiment, a second control limit curve is defined near the operating limit curve in the proper operation region. The second control limit curve is a curve adjacent to the operating limit curve so as to be along the operating limit curve.

Figure 15:
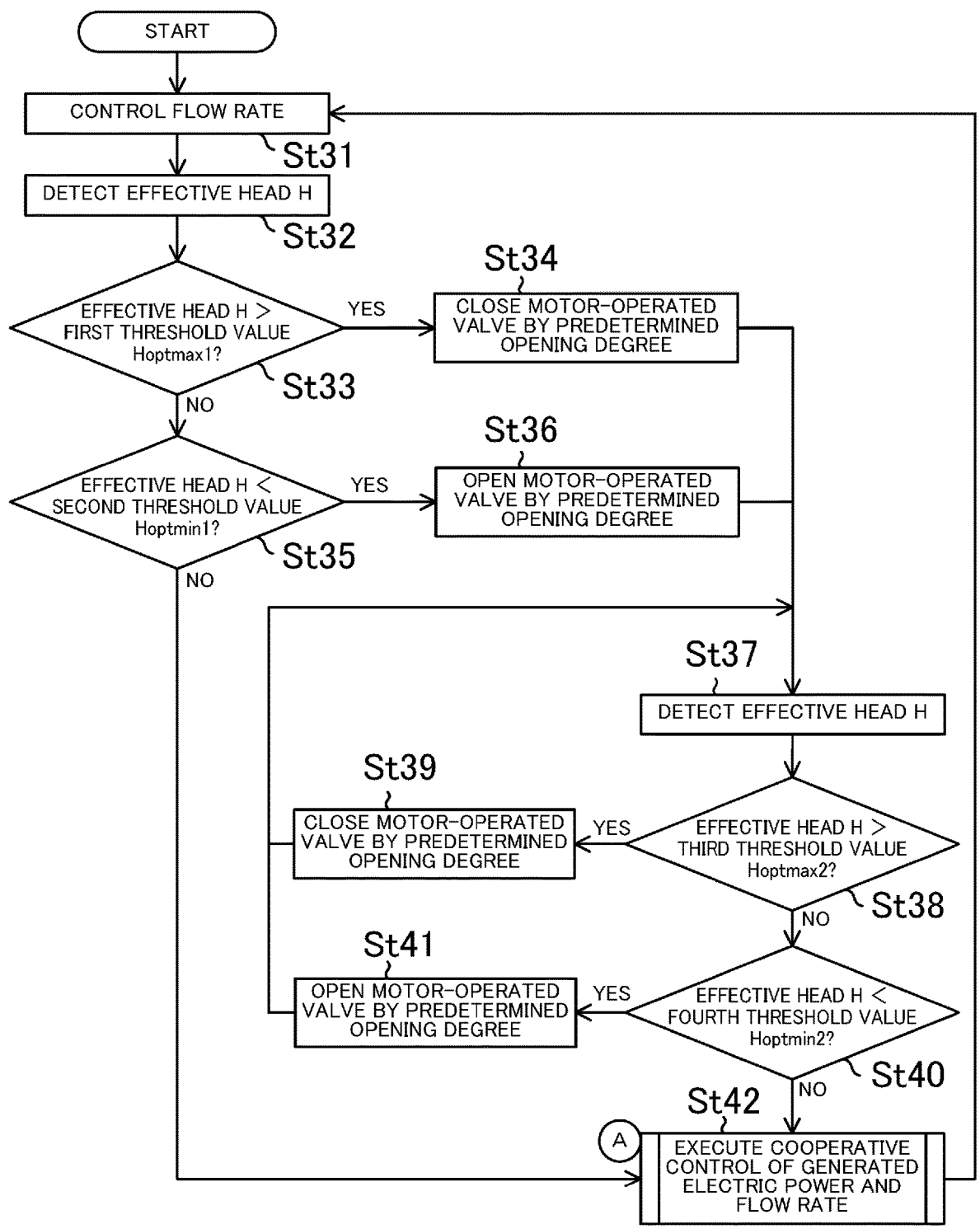
FIG. 15 is a basic flowchart of the operation of the hydroelectric power generation system according to the variation of the first embodiment.

As shown in FIG. 15, in the variation of the first embodiment, when the operation of the hydroelectric power generation system (10) is started, the flow rate control is executed just like in the first embodiment, such that the flow rate (Q) in the hydraulic turbine (11) converges to the flow rate command value (Q*) (Step St31). Then, the effective head (H) is detected (Step St32), and the effective head (H) is compared with the first threshold value (Hoptmax1).

If the effective head (H) is larger than the first threshold value (Hoptmax1), it is determined that the operation point of the hydraulic turbine (11) is in the cavitation region, and first control is executed to reduce the opening degree of the motor-operated valve (21) (Step St34). Then, the effective head (H) is detected again (Step St37), and the effective head (H) is compared with a third threshold value (Hoptmax2) (Step St38). Here, the third threshold value (Hoptmax2) is a predetermined threshold value which is smaller than the first threshold value (Hoptmax1) by a predetermined effective head. Here, the third threshold value (Hoptmax2) is an effective head corresponding to an intersection point between the first control limit curve and the flow rate command value (Q*), as shown in FIG. 14, and can be obtained from the characteristic map (M) or from an expression or table representing the relationship among the first control limit curve, the flow rate, and the effective head. That is to say, the third threshold value (Hoptmax2) is a variable that changes in accordance with the flow rate command value (Q*).

If the effective head (H) is larger than the third threshold value (Hoptmax2), it can be determined that the operation point of the hydraulic turbine (11) is in a predetermined region (referred to as a first region) between the cavitation boundary and the first control limit curve. In this case, the motor-operated valve control unit (60) further reduces the opening degree of the motor-operated valve (21) (Step St39). The operation in Steps St37 to St39 is continued until the effective head (H) becomes smaller than the third threshold value (Hoptmax2) (i.e., the operation point of the hydraulic turbine (11) moves to be inside the first region). On the other hand, while the operation point of the hydraulic turbine (11) is in the first region, the flow rate in the hydraulic turbine (11) is not controlled. As described above, when the operation point of the hydraulic turbine (11) moves to an area between the first control limit curve and the second control limit curve, the cooperative control of generated electric power and flow rate is executed in the same manner as in the first embodiment.

In addition, in Step St35, if the effective head (H) is smaller than the second threshold value (Hoptmin1), it is determined that the operation point of the hydraulic turbine (11) is on the operating limit curve, and second control is executed to increase the opening degree of the motor-operated valve (21) (Step St36). Then, the effective head (H) is detected (Step St37), and the effective head (H) is compared with a fourth threshold value (Hoptmin2) (Step St40). Here, the fourth threshold value (Hoptmin2) is a predetermined threshold value which is larger than the second threshold value (Hoptmin1) by a predetermined effective head. Here, the fourth threshold value (Hoptmin2) is an effective head corresponding to an intersection point between the second control limit curve and the flow rate command value (Q*), as shown in FIG. 14, and can be obtained from the characteristic map (M) or from an expression or table representing the relationship among the second control limit curve, the flow rate, and the effective head. That is to say, the fourth threshold value (Hoptmin2) is a variable that changes in accordance with the flow rate command value (Q*).

If the effective head (H) is smaller than the fourth threshold value (Hoptmin2), it can be determined that the operation point of the hydraulic turbine (11) is in the region between the operating limit curve and the second control limit curve (referred to as a the second region). In this case, the motor-operated valve control unit (60) further increases the opening degree of the motor-operated valve (21) (Step St41). The operation in Steps St 37, St40, and St41 is continued until the effective head (H) becomes smaller than the fourth threshold value (Hoptmin2) (i.e., the operation point of the hydraulic turbine (11) moves to be inside the second region). On the other hand, while the operation point of the hydraulic turbine (11) is in the second region, the flow rate in the hydraulic turbine (11) is not controlled. As described above, when the operation point of the hydraulic turbine (11) moves to an area between the first control limit curve and the second control limit curve, the cooperative control of generated electric power and flow rate is executed in the same manner as in the first embodiment.

As described above, in the variation of the first embodiment, when the operation point of the hydraulic turbine (11) is in the cavitation region, the operation point of the hydraulic turbine (11) is moved to be inside the first control limit curve. This can reliably reduce occurrence of cavitation. At this time, when the operation point of the hydraulic turbine (11) is in the first region, only the control of the motor-operated valve (21) is executed, and the flow rate control is not executed. This can substantially avoid the occurrence of hunting of the operation point of the hydraulic turbine (11) due to the flow rate control, and quickly and substantially eliminate the risk of causing cavitation.

In addition, in the variation of the first embodiment, when the operation point of the hydraulic turbine (11) has reached the operating limit curve, the operation point of the hydraulic turbine (11) is moved to be inside the second control limit curve. This can reliably prevent the operation point of the hydraulic turbine (11) from staying on the operating limit curve. At this time, when the operation point of the hydraulic turbine (11) is in the second region, only the control of the motor-operated valve (21) is executed, and the flow rate control is not executed. This can substantially avoid the occurrence of hunting of the operation point of the hydraulic turbine (11), and quickly move the operation point of the hydraulic turbine (11) to be apart from the operating limit curve.

Second Embodiment

A hydroelectric power generation system (10) of a second embodiment is different from that of the first embodiment in the configuration of the control unit (the generator controller (40)). The motor-operated valve (21) of the second embodiment constitutes a flow rate adjuster for adjusting the flow rate (Q) in the hydraulic turbine (11).

<Generator Control Unit>

In the second embodiment, the generator control unit (50) executes pressure control to bring the pressure (p) of the water downstream of the hydraulic turbine (11) close to a target pressure. Here, the target pressure is determined, for example, according to a request of a target to which water from the pipe (5) is supplied. The generator controller (40) receives a target pressure command value (p*) corresponding to the target pressure.

Figure 16:
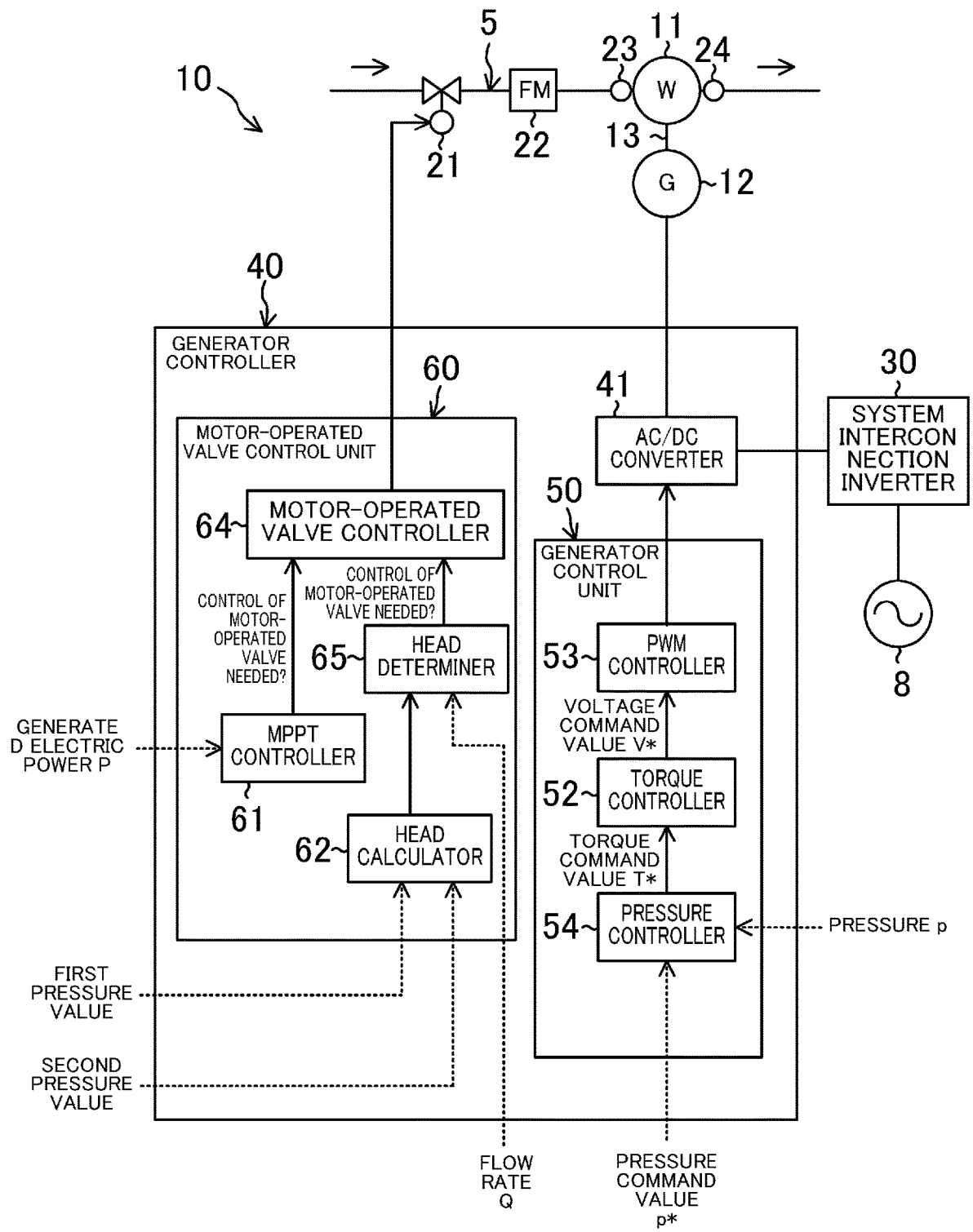
FIG. 16 is a view corresponding to FIG. 2, showing a second embodiment.

Specifically, as shown in FIG. 16, the generator control unit (50) of the second embodiment is provided with a pressure controller (54) instead of the flow rate controller (51) in the first embodiment. The pressure controller (54) receives, for example, the pressure (p) of the water detected by the second pressure sensor (24) and the pressure command value (p*), which is the target pressure. The pressure controller (54) calculates a torque command value (T*) for converging the flow rate (p) to the pressure command value (p*).

The torque controller (52) receives the torque command value (T*) which is a control target of the generator (12). The torque controller (52) calculates a voltage command value in accordance with the torque command value (T*).

The PWM controller (53) executes PWM control of the switching elements of the AC/DC converter (41) based on the voltage command value output from the torque controller (52). As a result, the pressure (p) converges to the pressure command value (p*).

<Motor-operated Valve Control Unit>

The motor-operated valve control unit (60) controls the opening degree of the motor-operated valve (21). Specifically, the motor-operated valve control unit (60) executes flow rate adjusting control for adjusting the flow rate (Q) in the hydraulic turbine (11) by the motor-operated valve (21) so that the flow rate (Q) in the hydraulic turbine (11) falls within the second range. In the second embodiment, the second range is set to be a proper operation region. Here, the flow rate adjusting control includes third control and fourth control. The third control is executed to return the operation point of the hydraulic turbine (11) from the cavitation region to the proper operation region. Specifically, in the third control, if the flow rate (Q) in the hydraulic turbine (11) is smaller than the lower limit value (a fifth threshold value (Qoptmin1)) of the second range, the opening degree of the motor-operated valve (21) is increased so as to increase the flow rate (Q). The fourth control is executed to return the operation point of the hydraulic turbine (11) from the operating limit curve to the proper operation region. Specifically, in the fourth control, if the flow rate (Q) in the hydraulic turbine (11) is larger than the upper limit value of the second range (a sixth threshold value (Qoptmax1)), the opening degree of the motor-operated valve (21) is reduced so as to reduce the flow rate (Q).

In addition, the motor-operated valve control unit (60) of the second embodiment executes generated electric power control for adjusting the flow rate (Q) in the hydraulic turbine (11) by the motor-operated valve (21) such that the electric power generated by the generator (12) is brought close to the target generated electric power.

The motor-operated valve control unit (60) in the second embodiment includes the head calculator (62) and a flow rate determiner (65) instead of the head determiner (63) in the first embodiment. The flow rate determiner (65) determines whether or not the motor-operated valve (21) needs to be controlled based on the effective head (H) output from the head calculator (62) and the flow rate (Q), and outputs a command value corresponding to the determination result.

<Basic Flow>

Figure 17:
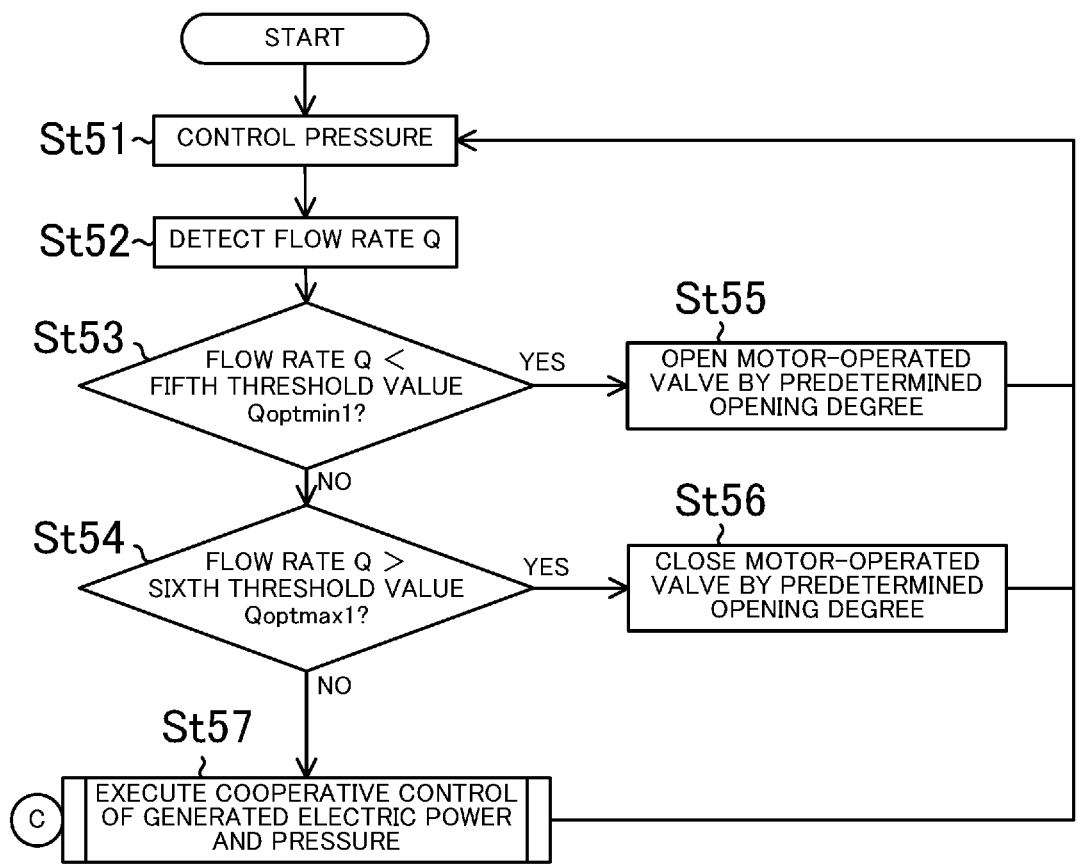
FIG. 17 is a basic flowchart of the operation of the hydroelectric power generation system according to the second embodiment.

As shown in FIG. 17, when the operation of the hydroelectric power generation system (10) is started, pressure control is executed to bring the pressure (p) of the water downstream of the hydraulic turbine (11) close to the target pressure (Step St51). That is to say, in the pressure control, the generator control unit (50) calculates the torque command value (T*) based on the current pressure (p) and the pressure command value (p*). The PWM controller (53) controls the switching elements of the AC/DC converter (41) based on the voltage command value calculated by the torque controller (52). This brings the pressure (p) of the water downstream of the hydraulic turbine (11) close to the pressure command value (p*).

Figure 18:
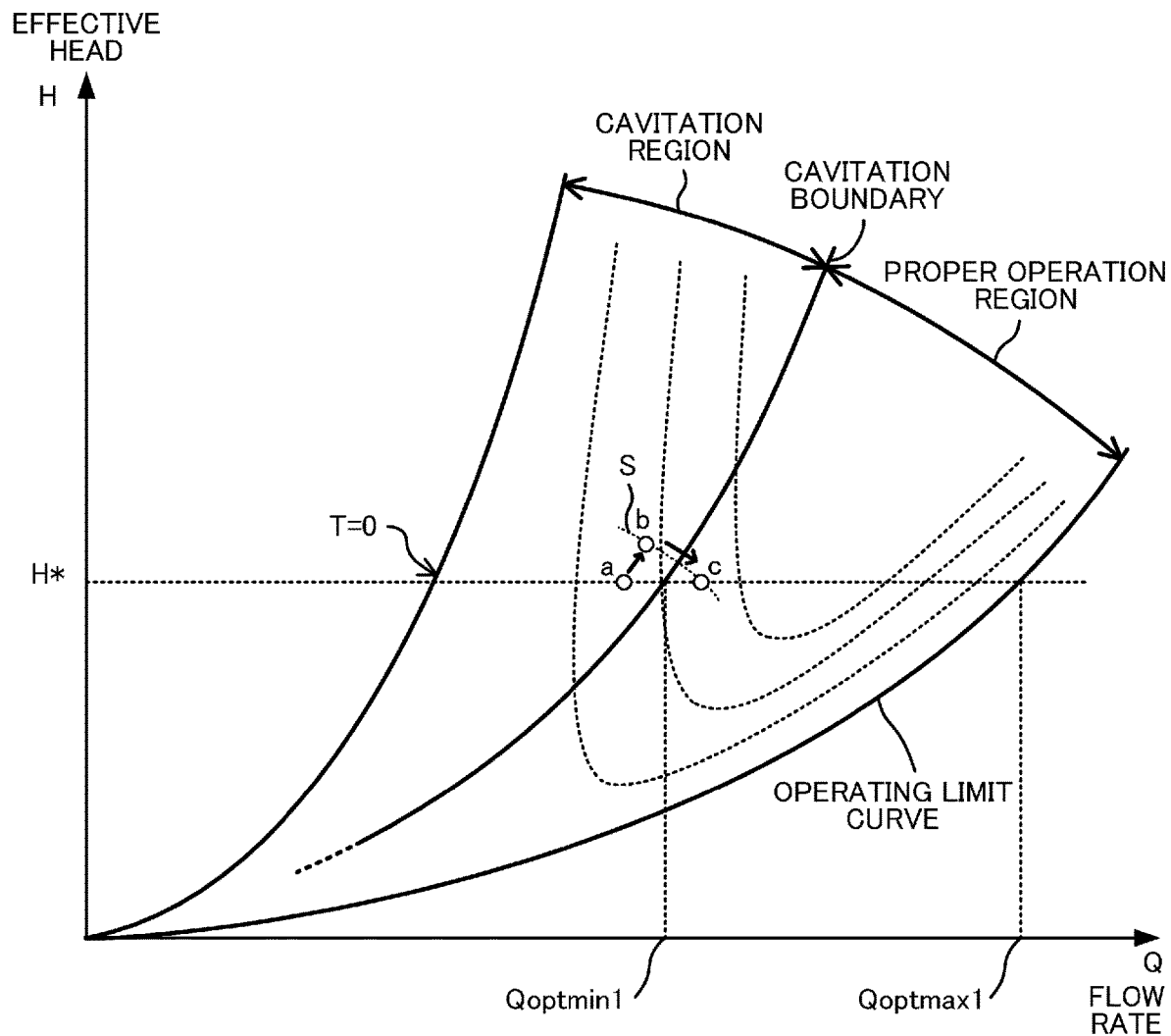
FIG. 18 is a characteristic map for explaining the operation of cooperatively executing third control and pressure control according to the second embodiment.

Next, in Step St52, the flow rate (Q) in the hydraulic turbine (11) is detected. In Step St53, the flow rate (Q) and the fifth threshold value (Qoptmin1) are compared with each other. Here, the fifth threshold value (Qoptmin1) is a determination value for determining whether or not the operation point of the hydraulic turbine (11) has reached the cavitation region, and is the lower limit value of the second range. More specifically, as shown in FIG. 18, the fifth threshold value (Qoptmin1) is a flow rate corresponding to the intersection point between the curve indicating the cavitation boundary and the effective head (H*) indicating the pressure command value (p*), and can be obtained from the characteristic map (M) or from an expression or table representing the relationship among the cavitation boundary, the flow rate, and the effective head. That is to say, the fifth threshold value (Qoptmin1) is a variable that changes in accordance with the pressure command value (p*).

In Step St53, if the flow rate (Q) is smaller than the fifth threshold value (Qoptmin1), it is determined that the operation point of the hydraulic turbine (11) is in the cavitation region, and the process moves to Step St55, where the opening degree of the motor-operated valve (21) is increased by a predetermined opening degree (the third control). In other words, in the third control, the flow rate (Q) in the hydraulic turbine (11) is increased. In Step St53, when the flow rate (Q) is larger than the fifth threshold value (Qoptmin1), the process moves to Step St54.

Figure 19:
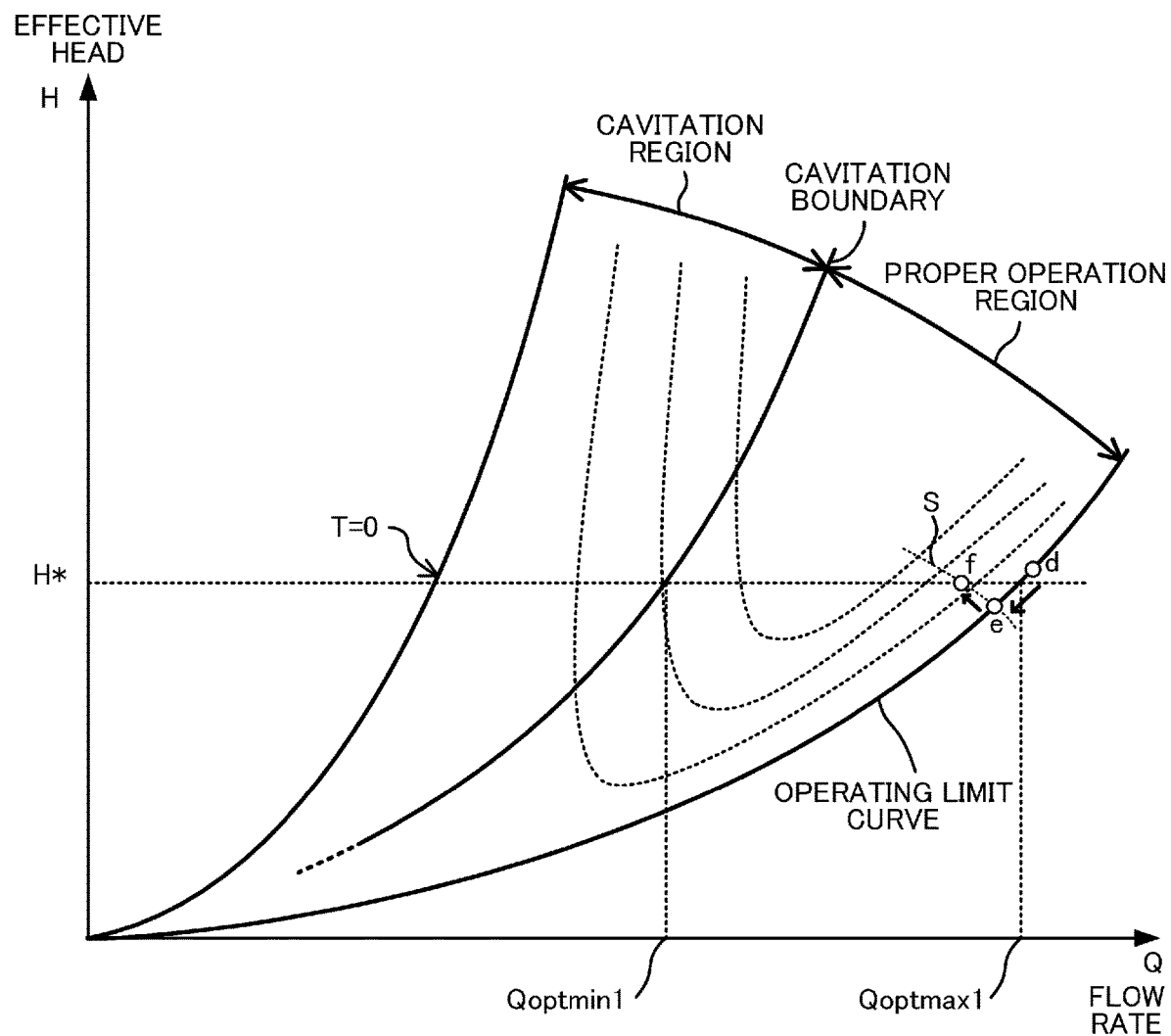
FIG. 19 is a characteristic map for explaining the operation of cooperatively executing fourth control and pressure control according to the second embodiment.

In Step St54, the flow rate (Q) and the sixth threshold value (Qoptmax1) are compared with each other. Here, the sixth threshold value (Qoptmax1) is a determination value for determining whether or not the hydraulic turbine (11) has reached the operating limit curve, and is the upper limit value of the second range. Here, as shown in FIG. 19, the sixth threshold value (Qoptmax1) is a flow rate corresponding to the intersection point between the operating limit curve and the effective head (H*) indicating the pressure command value (p*), and can be obtained from the characteristic map (M) or from an expression or table representing the relationship among the operating limit curve, the flow rate, and the effective head. That is to say, the sixth threshold value (Qoptmax1) is a variable that changes in accordance with the pressure command value (p*).

In Step St54, if the flow rate (Q) is larger than the sixth threshold value (Qoptmax1), it is determined that the operation point of the hydraulic turbine (11) has reached the operating limit curve, and the process moves to Step St56, where the opening degree of the motor-operated valve (21) is reduced by a predetermined opening degree (the fourth control). In other words, in the fourth control, the flow rate (Q) in the hydraulic turbine (11) is reduced. In Step St54, if the flow rate (Q) is smaller than the sixth threshold value (Qoptmax1), the process moves to Step St57, and cooperative control of generated electric power and pressure is executed.

When the opening degree of the motor-operated valve (21) is adjusted in Steps St55 and St56, the pressure control is not executed, and the torque value of the generator (12) is not controlled. That is to say, the pressure control in Step St51 is executed after the completion of the adjustment of the opening degree of the motor-operated valve (21).

<Third Control>

Details of the third control will be described in more detail with reference to FIG. 18.

In the pressure control described above, it is assumed that the flow rate (Q) in the hydraulic turbine (11) becomes excessively small, and that the operation point of the hydraulic turbine (11) has reached the cavitation region. In this case, the flow rate (Q) detected in Step St 52 in FIG. 17 becomes smaller than the fifth threshold value (Qoptmin1). Therefore, the process moves from Steps St53 to St54, and the opening degree of the motor-operated valve (21) is increased. Thus, for example, the operation point of the hydraulic turbine (11) moves from point a to point b in FIG. 18. Then, by the pressure control, the generator (12) is controlled such that the pressure (p) is brought close to the target pressure (p*). As a result, for example, the operation point of the hydraulic turbine (11) moves from point b to point c in FIG. 18. As a result, the effective head (H) of the hydraulic turbine (11) converges to the effective head (H*) corresponding to the target pressure (p*), and the operation point of the hydraulic turbine (11) returns to the proper operation region.

<Fourth Control>

Details of the fourth control will be described in more detail with reference to FIG. 19.

In the pressure control described above, it is assumed that the flow rate (Q) in the hydraulic turbine (11) becomes excessively large, and that the operation point of the hydraulic turbine (11) has reached the operating limit curve. For example, when the operation point of the hydraulic turbine (11) is at point d in FIG. 19, the effective head (H) (pressure (p)) of the hydraulic turbine (11) cannot be further reduced by the pressure control, such that the target pressure (p*) cannot be achieved.

In this case, the flow rate (Q) detected in Step St52 in FIG. 17 becomes smaller than the sixth threshold value (Qoptmax1). Therefore, the process moves from Steps St54 to St56, and the opening degree of the motor-operated valve (21) is reduced. Thus, for example, the operation point of the hydraulic turbine (11) moves from point d to point e in FIG. 18. Then, by the pressure control, the generator (12) is controlled such that the pressure (p) is brought close to the target pressure (p*). As a result, for example, the operation point of the hydraulic turbine (11) moves from point e to point f in FIG. 18. As a result, the effective head (H) of the hydraulic turbine (11) converges to the effective head (H*) corresponding to the target pressure (p*), and the operation point of the hydraulic turbine (11) returns to the proper operation region.

<Cooperative Control of Generated Electric Power and Pressure>

In FIG. 17, if it is determined that the flow rate (Q) is between the fifth threshold value (Qoptmin1) and the sixth threshold value (Qoptmax1), and the operation point of the hydraulic turbine (11) is in the proper operation region, the process moves to Step St57, where the cooperative control of generated electric power and pressure is executed. The cooperative control of generated electric power and pressure will be described with reference to FIGS. 17, 20, and 21.

As shown in FIG. 17, in the cooperative control of generated electric power and pressure, the pressure control and the MPPT control (generated electric power control) are cooperatively executed. In Step St61 in FIG. 20, a determination is made whether or not the operation is a first operation of the cooperative control of generated electric power and pressure. In the case of the first operation, the process moves to D (Step St71 in FIG. 21). In Step St71, the generated electric power (P) and the pressure (p) are detected. The method for detecting the generated electric power (P) and the pressure (p) is as described above. Then, in Step St72, when the opening degree of the motor-operated valve (21) is 100% (fully opened), the opening degree of the motor-operated valve (21) is reduced by a predetermined opening degree. If not, the opening degree of the motor-operated valve (21) is increased. Thereafter, the process returns to Step St51 in FIG. 17 again.

After the operation of D, the process moves from Step St61 to Step St62, where the generated electric power (P) and the pressure (p) are detected.

Figure 20:
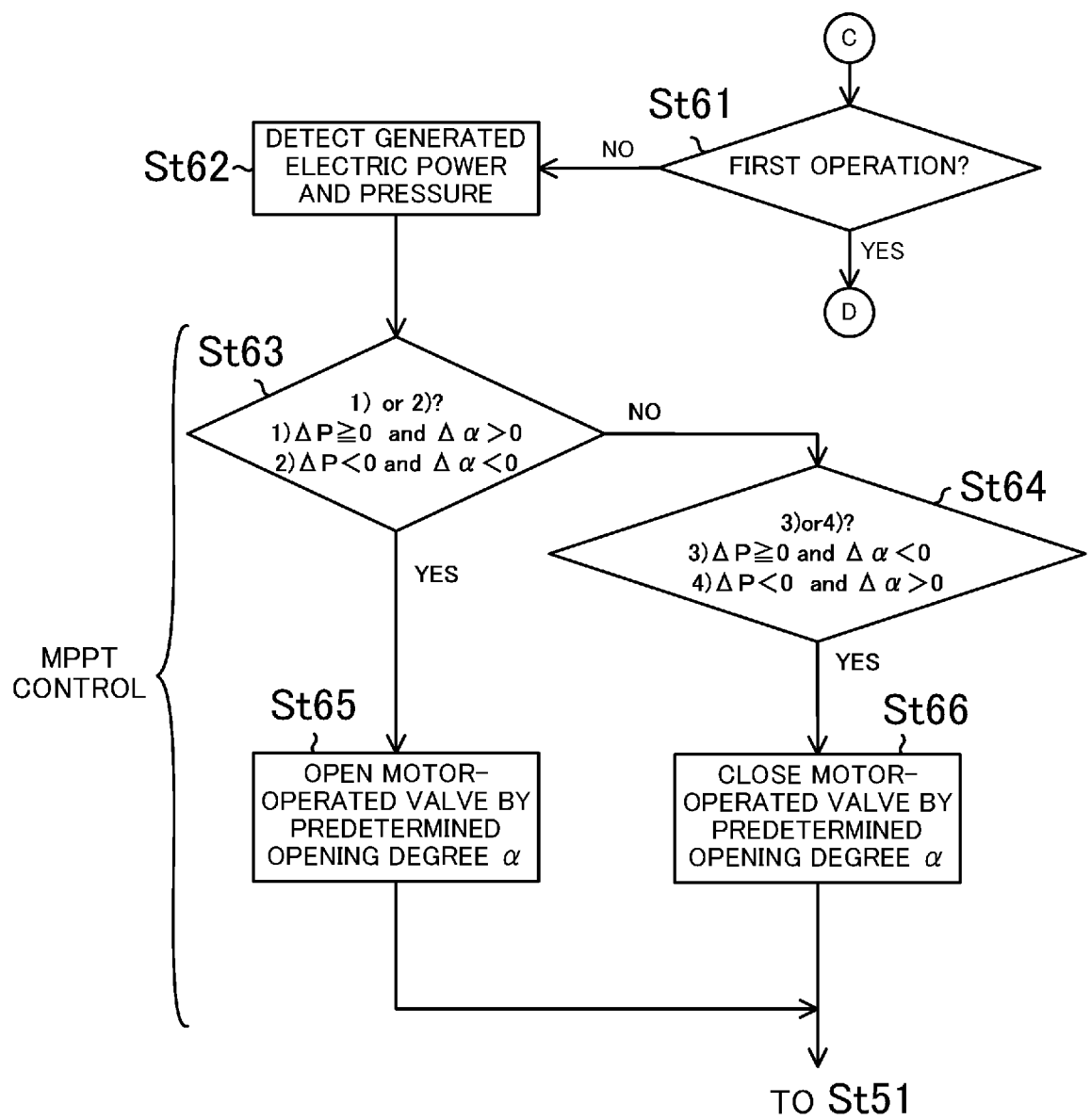
FIG. 20 is a basic flowchart of the cooperative control of pressure and generated electric power.
Figure 21:
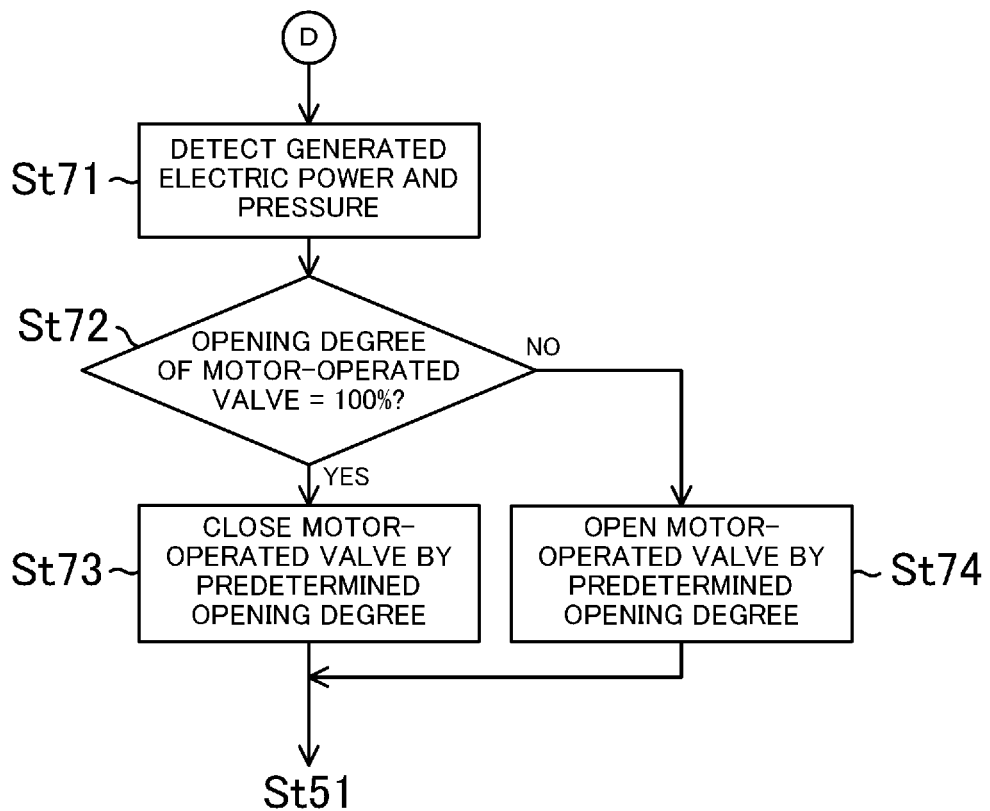
FIG. 21 is a flowchart of a part of the first cooperative control of pressure and generated electric power.

Next, in Step St63 to St66, the magnitude of the difference ΔP between the generated electric power detected in the current time and the generated electric power detected in the previous time, and the magnitude of the difference Δα between the opening degree of the motor-operated valve (21) in the current time and the opening degree of the motor-operated valve (21) in the previous time are determined. In the first MPPT control, the generated electric power (P) and the pressure (p) detected in Step St71 in FIG. 21 are the previous values, and the generated electric power (P) and pressure (p) detected in Step St62 in FIG. 20 are the current values. Based on these results, the opening degree of the motor-operated valve (21) is adjusted to increase the generated electric power (P).

Specifically, in Step St63, if 1) the ΔP is larger than or equal to 0 and the Δα is larger than 0, or 2) the ΔP is less than 0 and the Δα is less than 0, it can be determined that the generated electric power (P) can be increased by increasing the opening degree of the motor-operated valve (21). Accordingly, in this case, the motor-operated valve control unit (60) increases the opening degree of the motor-operated valve (21) by the predetermined opening degree a (Step St65).

In Step St64, if 3) the ΔP is equal to or larger than 0 and the Δα is less than 0, or 4) the ΔP is less than 0 and the Δα is larger than 0, it can be determined that the generated electric power (P) can be increased by reducing the opening degree of the motor-operated valve (21). Accordingly, in this case, the motor-operated valve control unit (60) reduces the opening degree of the motor-operated valve (21) by the predetermined opening degree a (Step St66).

When the opening degree of the motor-operated valve (21) is adjusted in this manner, the flow returns to Step St51 in FIG. 17, and the pressure control is executed. When the opening degree of the motor-operated valve (21) is adjusted by the MPPT control, the pressure of water downstream of the hydraulic turbine (11) is changed. However, this pressure control allows the pressure (p) of the hydraulic turbine (11) to quickly converge to the pressure command value (p*). Thereafter, the generated electric power (P) and the pressure (p) are detected again (Step St52), and then, the MPPT control is executed again to adjust the opening degree of the motor-operated valve (21). In the control of the opening degree of the motor-operated valve (21) in Steps St65 and St66, the pressure control is not executed, and the torque value of the generator (12) is not controlled. That is to say, the pressure control in Step St51 is executed after the completion of the adjustment of the opening degree of the motor-operated valve (21).

In the MPPT control, such a step is repeated, whereby the generated electric power (P) converges to the maximum generated electric power, and the pressure (p) of the hydraulic turbine (11) converges to the pressure command value (p*).

Advantages of Second Embodiment

In the second embodiment, the third control for increasing the opening degree of the motor-operated valve (21) and the pressure control are cooperatively executed when the operation point of the hydraulic turbine (11) is in the cavitation region. This allows the pressure (p) in the hydraulic turbine (11) to converge to the target pressure, and reliably reduces the occurrence of cavitation near the hydraulic turbine (11).

The timing for executing the third control and the timing for executing the pressure control are shifted from each other. This can substantially avoid the occurrence of hunting of the operation point of the hydraulic turbine (11), and improve the convergence of the pressure control and of the third control.

When the operation point of the hydraulic turbine (11) reaches the operating limit curve, the fourth control for increasing the opening degree of the motor-operated valve (21) and the pressure control are cooperatively executed. This can quickly and substantially prevent the operation point of the hydraulic turbine (11) from staying on the operating limit curve while allowing the pressure (p) in the hydraulic turbine (11) to converge to the target pressure.

The timing for executing the fourth control and the timing for executing the pressure control are shifted from each other. This can substantially avoid the occurrence of hunting of the operation point of the hydraulic turbine (11), and improve the convergence of the pressure control and of the fourth control.

In the second embodiment, the pressure control for bringing the pressure (p) of the water downstream of the hydraulic turbine (11) close to the target pressure, and the generated electric power control for adjusting the opening degree of the motor-operated valve (21) so as to bring the generated electric power (P) in the generator (12) close to the target electric power are cooperatively executed. Therefore, the pressure (p) of water downstream of the hydraulic turbine (11) and the generated electric power (P) of the generator (12) can be brought close to the desired target value.

In the generated electric power control, the MPPT control is executed so as to bring the generated electric power (P) close to the maximum generated electric power. Therefore, the power generation efficiency of the generator (12) can be improved.

The timing for executing the pressure control and the timing for executing the MPPT control are shifted from each other. This can substantially avoid the occurrence of hunting of the operation point of the hydraulic turbine (11), and improve the convergence of the pressure control and of the MPPT control.

Variation of Second Embodiment

In a variation of the second embodiment, two control limit curves are provided just like in the variation of the first embodiment.

Figure 22:
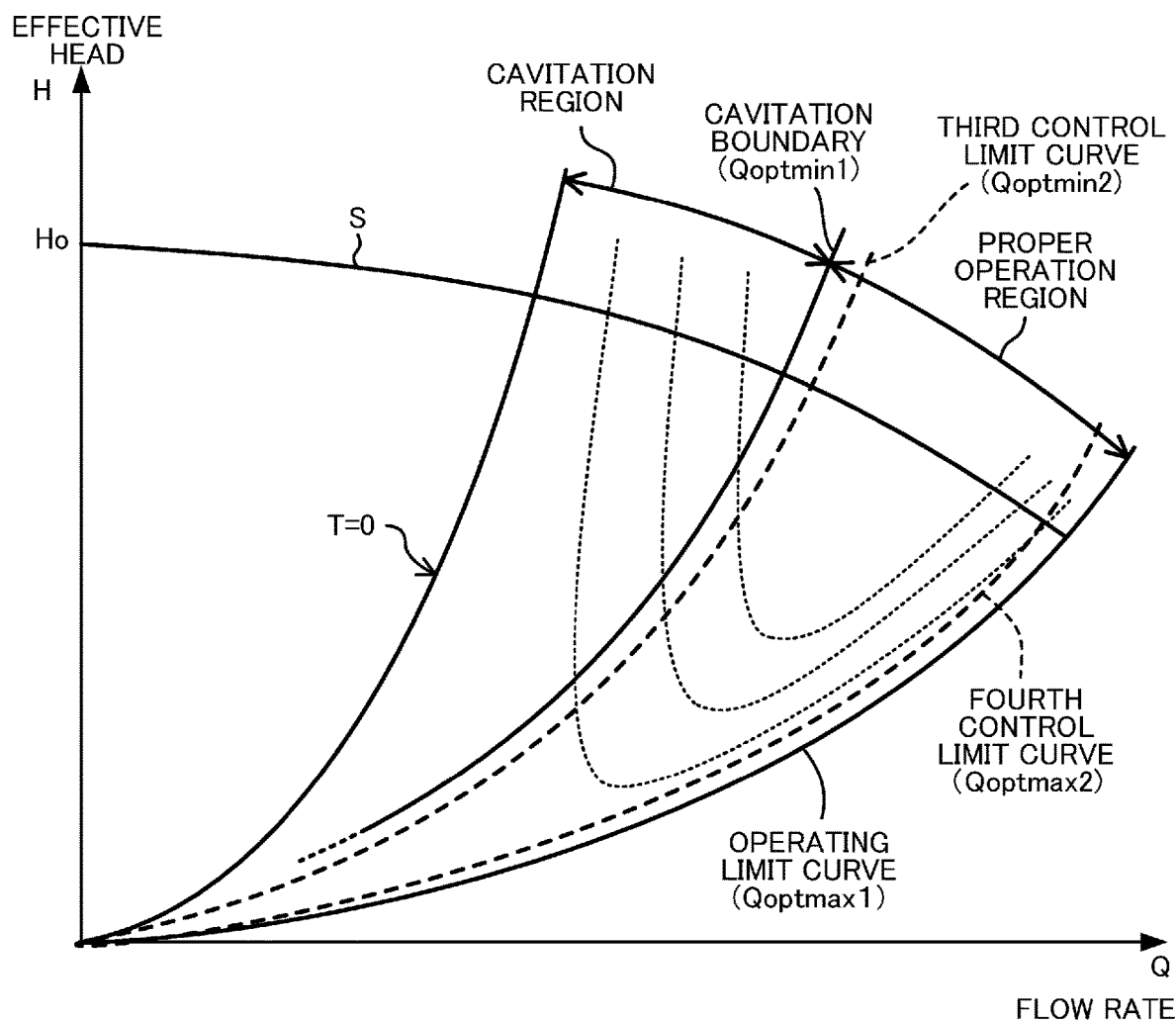
FIG. 22 is a characteristic map for explaining third and fourth control limit curves in a hydroelectric power generation system according to a variation of the second embodiment.

As shown in FIG. 22, in the variation of the second embodiment, a third control limit curve is defined near the cavitation boundary in the proper operation region. The third control limit curve is a curve adjacent to the cavitation boundary so as to be along the cavitation boundary. In the variation of the second embodiment, a fourth control limit curve is defined near the operating limit curve in the proper operation region. The fourth control limit curve is a curve adjacent to the operating limit curve so as to be along the operating limit curve.

Figure 23:
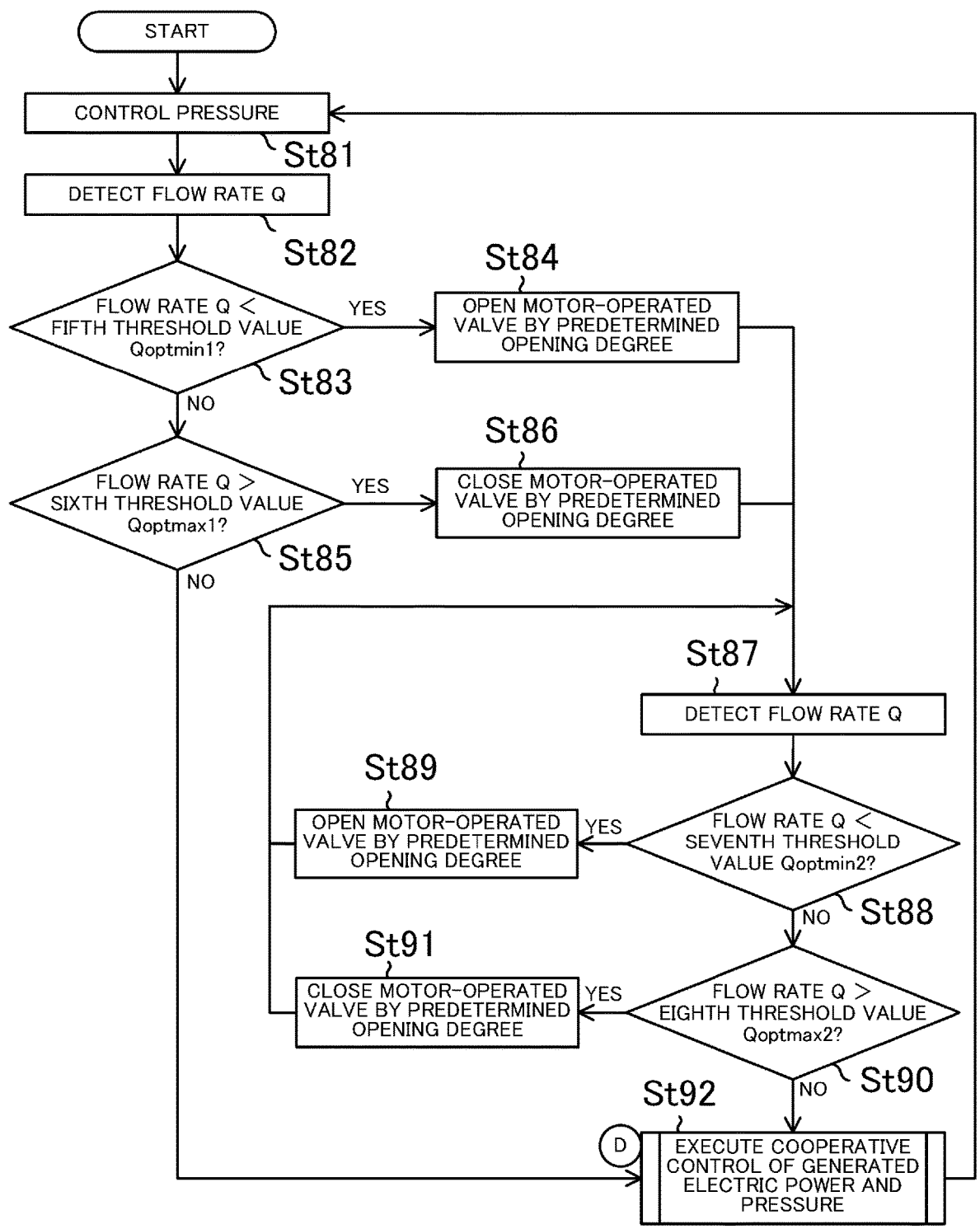
FIG. 23 is a basic flowchart of the operation of the hydroelectric power generation system according to the variation of the second embodiment.

As shown in FIG. 23, in the variation of the second embodiment, when the operation of the hydroelectric power generation system (10) is started, the pressure control is executed just like in the second embodiment (Step St81). Then, the flow rate (Q) is detected (Step St82), and the flow rate (Q) is compared with the fifth threshold value (Qoptmin1).

If the flow rate (Q) is smaller than the fifth threshold value (Qoptmin1), it is determined that the operation point of the water turbine (11) is in the cavitation region, and the third control for increasing the opening degree of the motor-operated valve (21) is executed (step St 84). Then, the flow rate (Q) is detected again (Step St87), and the flow rate (Q) is compared with a seventh threshold value (Qoptmin2) (Step St88). Here, the seventh threshold value (Qoptmin2) is a predetermined threshold value which is larger than the fifth threshold value (Qoptmin1) by a predetermined flow rate. Here, the seventh threshold value (Qoptmin2) is a flow rate corresponding to an intersection point between the third control limit curve shown in FIG. 22 and the effective head corresponding to the pressure command value (p*), and can be obtained from the characteristic map (M) or from an expression or table representing the relationship among the third control limit curve, the flow rate, and the effective head. That is to say, the seventh threshold value (Qoptmin2) is a variable that changes in accordance with the pressure command value (p*).

If the flow rate (Q) is smaller than the seventh threshold value (Qoptmin2), it can be determined that the operation point of the hydraulic turbine (11) is in a predetermined region (referred to as a third region) between the cavitation boundary and the third control limit curve. In this case, the motor-operated valve control unit (60) further increases the opening degree of the motor-operated valve (21) (Step St89). The operation in Steps St87 to St89 is continued until the flow rate (Q) becomes larger than the seventh threshold value (Qoptmin2) (i.e., the operation point of the hydraulic turbine (11) moves to be inside the third region). On the other hand, while the operation point of the hydraulic turbine (11) is in the third region, the pressure in the hydraulic turbine (11) is not controlled. As described above, when the operation point of the hydraulic turbine (11) moves to an area between the third control limit curve and the fourth control limit curve, the cooperative control of generated electric power and pressure is executed in the same manner as in the second embodiment.

In addition, in Step St85, when the flow rate (Q) is larger than the sixth threshold value (Qoptmax1), it is determined that the operation point of the hydraulic turbine (11) is on the operating limit curve, and the fourth control is executed to reduce the opening degree of the motor-operated valve (21) (Step St86). Then, the flow rate (Q) is detected again (Step St87), and the flow rate (Q) is compared with an eighth threshold value (Qoptmax2) (Step St90). Here, the eighth threshold value (Qoptmax2) is a predetermined threshold value that is smaller than the sixth threshold value (Hoptmax1) by a predetermined flow rate. Here, the eighth threshold value (Qoptmax2) is a flow rate corresponding to an intersection point between the fourth control limit curve shown in FIG. 22 and the effective head corresponding to the pressure command value (p*), and can be obtained from the characteristic map (M) or from an expression or table representing the relationship among the fourth control limit curve, the flow rate, and the effective head. That is to say, the eighth threshold value (Qoptmax2) is a variable that changes in accordance with the pressure command value (p*).

If the flow rate (Q) is larger than the eighth threshold value (Qoptmax2), it can be determined that the operation point of the hydraulic turbine (11) is in the region (referred to as a fourth region) between the operating limit curve and the fourth control limit curve. In this case, the motor-operated valve control unit (60) further reduces the opening degree of the motor-operated valve (21) (Step St91). The operation in Steps St87, St90, and St91 is continued until the flow rate (Q) becomes smaller than the eighth threshold value (Qoptmax2) (i.e., the operation point of the hydraulic turbine (11) moves to be inside the fourth region). On the other hand, while the operation point of the hydraulic turbine (11) is in the fourth region, the pressure in the hydraulic turbine (11) is not controlled. As described above, when the operation point of the hydraulic turbine (11) moves to the area between the third control limit curve and the fourth control limit curve, the cooperative control of generated electric power and pressure is executed in the same manner as in the second embodiment.

As described above, in the variation of the second embodiment, when the operation point of the hydraulic turbine (11) is in the cavitation region, the operation point of the hydraulic turbine (11) is moved to be inside the third control limit curve. This can reliably reduce occurrence of cavitation. At this time, when the operation point of the hydraulic turbine (11) is in the third region, only the control of the motor-operated valve (21) is executed, and the pressure control is not executed. This can substantially avoid the occurrence of hunting of the operation point of the hydraulic turbine (11) due to the pressure control, and quickly and substantially eliminate the risk of causing cavitation.

In addition, in the variation of the second embodiment, when the operation point of the hydraulic turbine (11) has reached the operating limit curve, the operation point of the hydraulic turbine (11) is moved to be inside the fourth control limit curve. This can reliably prevent the operation point of the hydraulic turbine (11) from staying on the operating limit curve. At this time, when the operation point of the hydraulic turbine (11) is in the fourth region, only the control of the motor-operated valve (21) is executed, and the pressure control is not executed. This can substantially avoid the occurrence of hunting of the operation point of the hydraulic turbine (11) due to the pressure control, and quickly move the operation point of the hydraulic turbine (11) to be apart from the operating limit curve.

Other Embodiments

Figure 24:
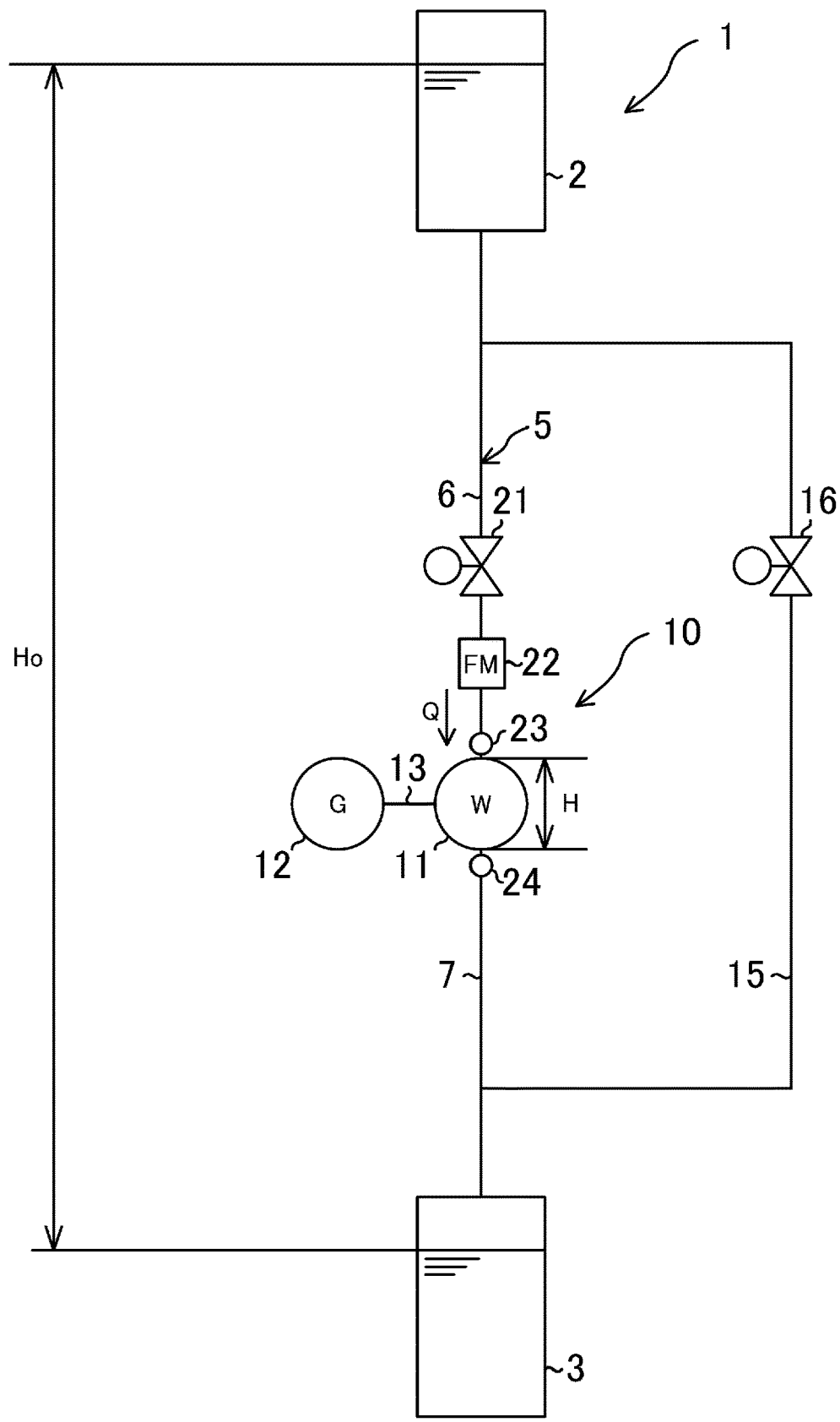
FIG. 24 is a diagram schematically illustrating an overall configuration of a hydroelectric power generation system including a pipe according to another embodiment.

As shown in FIG. 24, the hydroelectric power generation system (10) of the above-described embodiments may be provided with a bypass circuit (15). The bypass circuit (15) is connected to the pipe (5) so as to be in parallel with the hydraulic turbine (11). The starting end of the bypass circuit (15) is connected, for example, to the inflow side of the motor-operated valve (21). The terminal end of the bypass circuit (15) is connected, for example, to a portion downstream of the hydraulic turbine (11). A bypass valve (16), which is a motor-operated valve, is connected to the bypass circuit (15). Also in such a configuration, it is assumed that the flow rate (Q) in the hydraulic turbine (11) and the pressure (p) of water downstream of the hydraulic turbine (11) are brought close to the target value. In this case, the control in each of the embodiments described above can be applied.

The head adjuster of the first embodiment is configured as the motor-operated valve (21). However, the head adjuster may have any configuration as long as it can adjust the effective head of the hydraulic turbine (11). Specifically, a hydraulic turbine may be used as the head adjuster. Further, for example, a plurality of pipes having different resistances may be provided to switchably communicate with the pipe (5), thereby adjusting the effective head of the hydraulic turbine (11).

Likewise, the flow rate adjuster in the second embodiment may have any configuration as long as it can adjust the flow rate of the hydraulic turbine (11). Specifically, a hydraulic turbine may be used as the flow rate adjuster. Further, for example, a plurality of pipes having different resistances may be provided to switchably communicate with the pipe (5), thereby adjusting the flow rate in the hydraulic turbine (11).

In the first embodiment, the first range is set to be a proper operation region, but may be set to be narrower than the proper operation region. Specifically, in the vicinity of the cavitation boundary of the proper operation region, the upper limit value of the first range may be set such that the cavitation boundary is adjacent to the cavitation boundary to be along the cavitation boundary. By such setting, the first control can be executed before the operation point of the hydraulic turbine (11) reaches the cavitation region. This can more reliably reduce the occurrence of cavitation.

In addition, in the vicinity of the operating limit curve in the proper operation region, the lower limit value of the first range may be set so as to be adjacent to the operating limit curve to be along the operating limit curve. By setting in this way, it is possible to execute the second control before the operation point of the hydraulic turbine (11) reaches the operating limit curve. This can reliably prevent the operation point from reaching the operating limit curve. In the case where the first range is set as described above, the first control limit curve may be a curve adjacent to a curve corresponding to the upper limit value of the first range so as to be along the curve, for example, and the second control limit curve may be a curve adjacent to the curve corresponding to the lower limit value of the first range so as to be along the curve, for example.

Likewise, in the second embodiment, the second range is set to be a proper operation region, but may be set to be narrower than the proper operation region. Specifically, in the vicinity of the cavitation boundary of the proper operation region, the lower limit value of the second range may be set such that the cavitation boundary is adjacent to the cavitation boundary to be along the cavitation boundary. By such setting, the third control can be executed before the operation point of the hydraulic turbine (11) reaches the cavitation region. This can more reliably reduce the occurrence of cavitation.

In addition, in the vicinity of the operating limit curve in the proper operation region, the upper limit value of the second range may be set so as to be adjacent to the operating limit curve to be along the operating limit curve. By setting in this way, it is possible to execute the fourth control before the operation point of the hydraulic turbine (11) reaches the operating limit curve. This can reliably prevent the operation point from reaching the operating limit curve. In the case where the second range is set as described above, the third control limit curve may be, e.g., a curve adjacent to, and along, the curve corresponding to the lower limit value of the second range, and the fourth control limit curve may be, e.g., a curve adjacent to, and along, the curve corresponding to the upper limit value of the second range.

In the first embodiment, either one or both of the cooperative control of generated electric power and flow rate, and the control for returning the operation point of the hydraulic turbine (11) from the operating limit curve may be omitted.

In the second embodiment, either one or both of the cooperative control of generated electric power and pressure, and the control for returning the operation point of the hydraulic turbine (11) from the operating limit curve may be omitted.

In the cooperative control of generated electric power and flow rate of the first embodiment, the flow rate control for bringing the flow rate (Q) of the hydraulic turbine (11) close to the target flow rate, and the generated electric power control for bringing the generated electric power of the generator (12) close to the maximum generated electric power output are cooperatively executed. However, in the generated electric power control, the target generated electric power of the generator (12) does not necessarily have to be the maximum generated electric power. For example, in the electric power system (8), when there is a request for reducing the generated electric power, it may be necessary to reduce the electric power generated by the generator (12) to a predetermined value or less. In this case, for example, the target generated electric power of the generator (12) is set to a value satisfying the request for reduction.

In the cooperative control of generated electric power and pressure according to the second embodiment, the pressure control for bring the pressure (p) of water downstream of the hydraulic turbine (11) close to the target pressure, and the generated electric power control for bringing the electric power generated by the generator (12) close to the maximum generated electric power are cooperatively executed. However, in the generated electric power control, the target generated electric power of the generator (12) does not necessarily have to be the maximum generated electric power. For example, in the electric power system (8), when there is a request for reducing the generated electric power, it may be necessary to reduce the electric power generated by the generator (12) to a predetermined value or less. In this case, for example, the target generated electric power of the generator (12) is set to a value satisfying the request for reduction.

In the flow rate control of the first embodiment, the flow rate (Q) in the hydraulic turbine (11) is controlled by controlling the torque value of the generator (12). However, it is also possible to adjust the flow rate (Q) in the hydraulic turbine (11) by controlling the rotational speed of the generator (12), for example.

In the pressure control according to the second embodiment of the present invention, the torque value of the generator (12) is controlled to adjust the pressure (p) of water downstream of the hydraulic turbine (11). However, it is also possible to adjust the pressure (p) of water downstream of the hydraulic turbine (11) by controlling the rotational speed of the generator (12), for example.

The flowmeter (22) provided in the pipe (5) may be omitted. Alternatively, the flow rate (Q) in the hydraulic turbine (11) may be estimated using the characteristic map (M) shown in FIG. 3. Specifically, for example, by estimating the operation point of the hydraulic turbine (11) using, e.g., the torque value and rotational speed of the generator (12), the flow rate (Q) in the hydraulic turbine (11) corresponding to the operation point can be obtained.

In a configuration using the characteristic map (M) without using the flowmeter, when the operation point of the hydraulic turbine (11) reaches the operating limit curve, the operation point of the hydraulic turbine (11) cannot be accurately specified even when the characteristic map (M) is used, and the flow rate (Q) in the hydraulic turbine (11) cannot be accurately determined. In contrast, in the above embodiment, since the operation point of the hydraulic turbine (11) can be quickly returned to the proper operation region, the flow rate (Q) in the hydraulic turbine (11) can be reliably estimated using, e.g., the characteristic map (M).

The hydroelectric power generation system (10) is not limited to the pipe (5), but may also be installed in an open waterway or a path including a closed waterway (for example, a duct) and an open waterway. As an example, the hydroelectric power generation system (10) may be installed in an agricultural waterway. The installation place of the hydroelectric power generation system (10) is not limited to the waterworks (1).

The fluid to be supplied to the hydraulic turbine (11) is not limited to water. For example, brine which is used in an air conditioner installed in, e.g., a building may be used as the fluid.

INDUSTRIAL APPLICABILITY

The present invention is useful as a hydroelectric power generation system.

DESCRIPTION OF REFERENCE CHARACTERS

5 Pipe (Channel)
10 Hydropower System

11 Hydraulic Turbine
12 Generator
21 Motor-operated Valve (Head Adjuster, Flow Rate Adjuster)
40 Generator Controller (Control Unit)

The invention claimed is:

1. A hydroelectric power generation system comprising:
a hydraulic turbine disposed in a channel through which a fluid flows;
a generator driven by the hydraulic turbine;
a head adjuster adjusting an effective head of the hydraulic turbine; and
a controller cooperatively executing: flow rate control for controlling the generator such that a flow rate in the hydraulic turbine is brought close to a target flow rate; and head adjusting control for adjusting the effective head of the hydraulic turbine using the head adjuster such that the effective head of the hydraulic turbine falls within a first range,
wherein an upper limit value of the first range is a determination value for determining whether or not the operation point of the hydraulic turbine has reached a cavitation region,
wherein if a condition indicating that the effective head of the hydraulic turbine is larger than the upper limit value of the first range is satisfied, the controller executes, as the head adjusting control, first control for reducing the effective head of the hydraulic turbine using the head adjuster to return an operation point of the hydraulic turbine from the cavitation region to a proper operation region, the first control comprising reducing an opening degree of the head adjuster by a first predetermined opening degree,
wherein if a condition indicating that the effective head of the hydraulic turbine is smaller than a lower limit value of the first range is satisfied, the controller executes, as the head adjusting control, second control for increasing the effective head of the hydraulic turbine using the head adjuster to return the operation point of the hydraulic turbine from an inoperable operation point to the proper operation region, the second control comprising increasing the opening degree of the head adjuster by a second predetermined opening degree,
the lower limit value of the first range is a determination value for determining whether or not the operation point of the hydraulic turbine has reached an operating limit curve, and
the operation limit curve corresponds to a boundary of an operation point where it is not possible to adjust the flow rate in the hydraulic turbine.

2. The hydroelectric power generation system of claim 1, wherein
after executing the first control, if a condition indicating that the effective head of the hydraulic turbine is larger than a predetermined threshold value smaller than the upper limit value of the first range is satisfied, the controller further reduces the effective head of the hydraulic turbine using the head adjuster.

3. The hydroelectric power generation system of claim 1, wherein
after executing the second control, if a condition indicating that the effective head of the hydraulic turbine is smaller than a predetermined threshold value larger than the lower limit value of the first range is satisfied, the controller further increases the effective head of the hydraulic turbine using the head adjuster.

4. The hydroelectric power generation system of claim 1, wherein
the controller executes the flow rate control and the head adjusting control at different timings.

5. The hydroelectric power generation system of claim 1, wherein
the controller cooperatively executes: the flow rate control; and generated electric power control for adjusting the effective head of the hydraulic turbine using the head adjuster such that electric power generated by the generator is brought close to a target electric power.

6. The hydroelectric power generation system of claim 5, wherein
the controller executes the flow rate control and the generated electric power control at different timings.

7. The hydroelectric power generation system of claim 5, wherein
in the generated electric power control, the controller adjusts the effective head of the hydraulic turbine using the head adjuster such that the electric power generated by the generator is brought close to a maximum generated electric power.

8. The hydroelectric power generation system of claim 1, wherein
the head adjuster is configured as a valve disposed in series with the hydraulic turbine in the channel.

* * * * *